(12) United States Patent
Awazu et al.

(10) Patent No.: US 8,558,902 B2
(45) Date of Patent: Oct. 15, 2013

(54) IMAGE PICKUP APPARATUS INCLUDING A HEAT EXHAUSTING MEMBER

(75) Inventors: Kouhei Awazu, Saitama (JP); Hayato Yamashita, Saitama (JP)

(73) Assignee: Fujifilm Corporation, Tokyo (JP)

( * ) Notice: Subject to any disclaimer, the term of this patent is extended or adjusted under 35 U.S.C. 154(b) by 293 days.

(21) Appl. No.: 12/893,767

(22) Filed: Sep. 29, 2010

(65) Prior Publication Data

US 2011/0074963 A1 Mar. 31, 2011

(30) Foreign Application Priority Data

Sep. 30, 2009 (JP) ................................ 2009-228227

(51) Int. Cl.
*H04N 5/228* (2006.01)
(52) U.S. Cl.
USPC ............... 348/208.4; 348/208.99; 348/208.2; 348/208.7
(58) Field of Classification Search
USPC .................... 348/208.4, 208.99, 208.2, 208.7
See application file for complete search history.

(56) References Cited

U.S. PATENT DOCUMENTS

| | | | |
|---|---|---|---|
| 7,479,986 B2 | 1/2009 | Karaki | |
| 2008/0055420 A1 | 3/2008 | Orihashi et al. | |
| 2008/0297635 A1 | 12/2008 | Aoki | |

FOREIGN PATENT DOCUMENTS

| | | | |
|---|---|---|---|
| JP | 2004-120583 A | | 4/2004 |
| JP | 2005-217993 A | | 8/2005 |
| JP | 2005217993 A | * | 8/2005 |
| JP | 2006-345052 A | | 12/2006 |
| JP | 2007-158664 A | | 6/2007 |
| JP | 2008-64863 A | | 3/2008 |
| JP | 2008-300899 A | | 12/2008 |
| JP | 2009-198613 A | | 9/2009 |
| JP | 2009-216946 A | | 9/2009 |

OTHER PUBLICATIONS

Notification of Reasons for Rejection dated Jul. 16, 2013 with partial English translation.

\* cited by examiner

*Primary Examiner* — Antoinette Spinks
(74) *Attorney, Agent, or Firm* — McGinn IP Law Group, PLLC

(57) ABSTRACT

An image pickup apparatus includes: an image pickup element; a shake detection device configured to detect a vibration applied to a main body of the image pickup apparatus; and an image blur correction device configured to perform a correction of removing an image blur of the image due to the vibration, the image blur correction device including: a holding member configured to hold the image pickup element; a first driving device configured to move the holding member between a first position where the center of the image pickup element substantially corresponds to the optical axis and a second position; a heat exhausting member arranged to be in contact with the holding member when the holding member is located at the second position; and a control device configured to drive the first driving device based on the vibration.

20 Claims, 33 Drawing Sheets

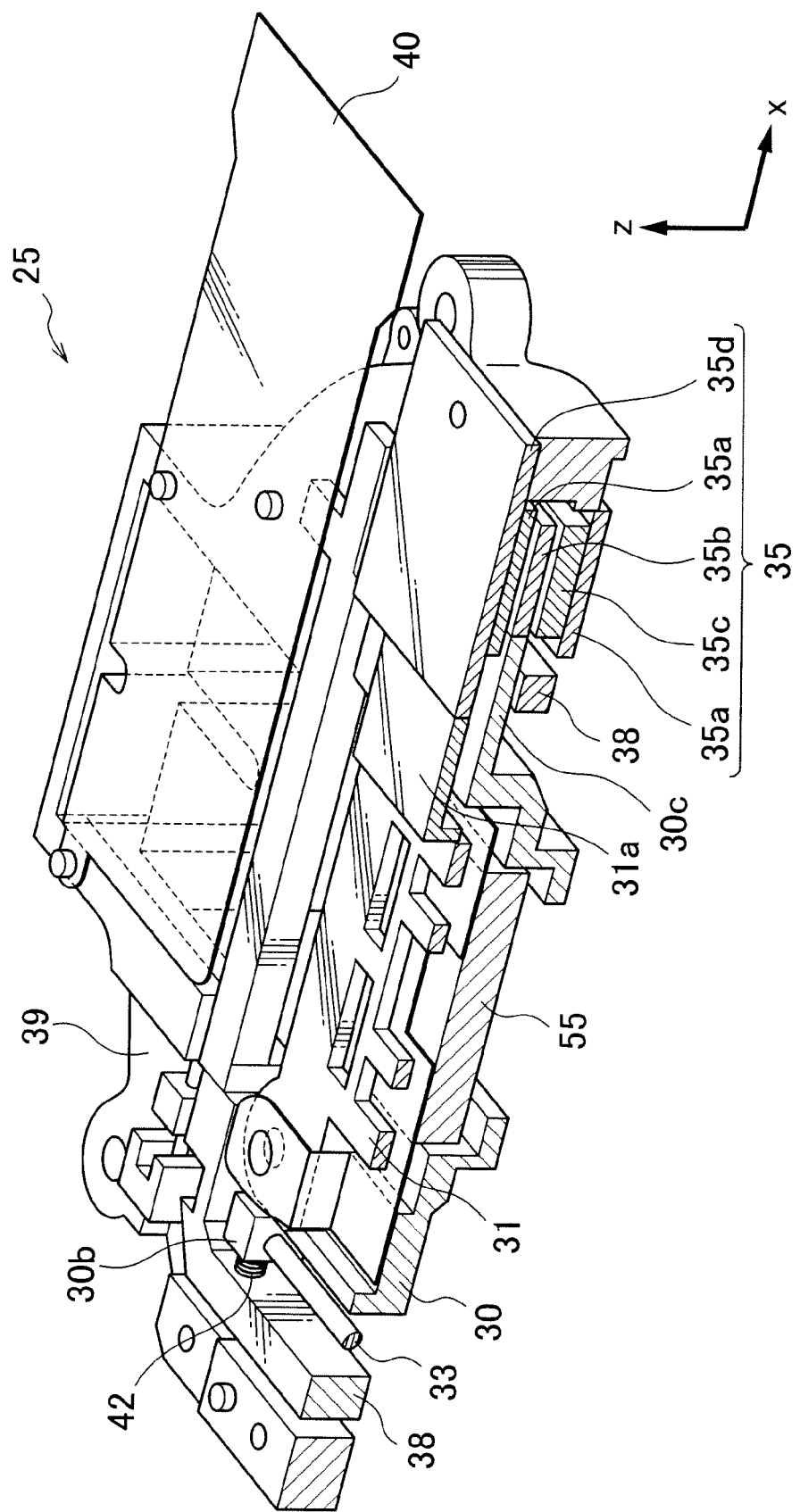

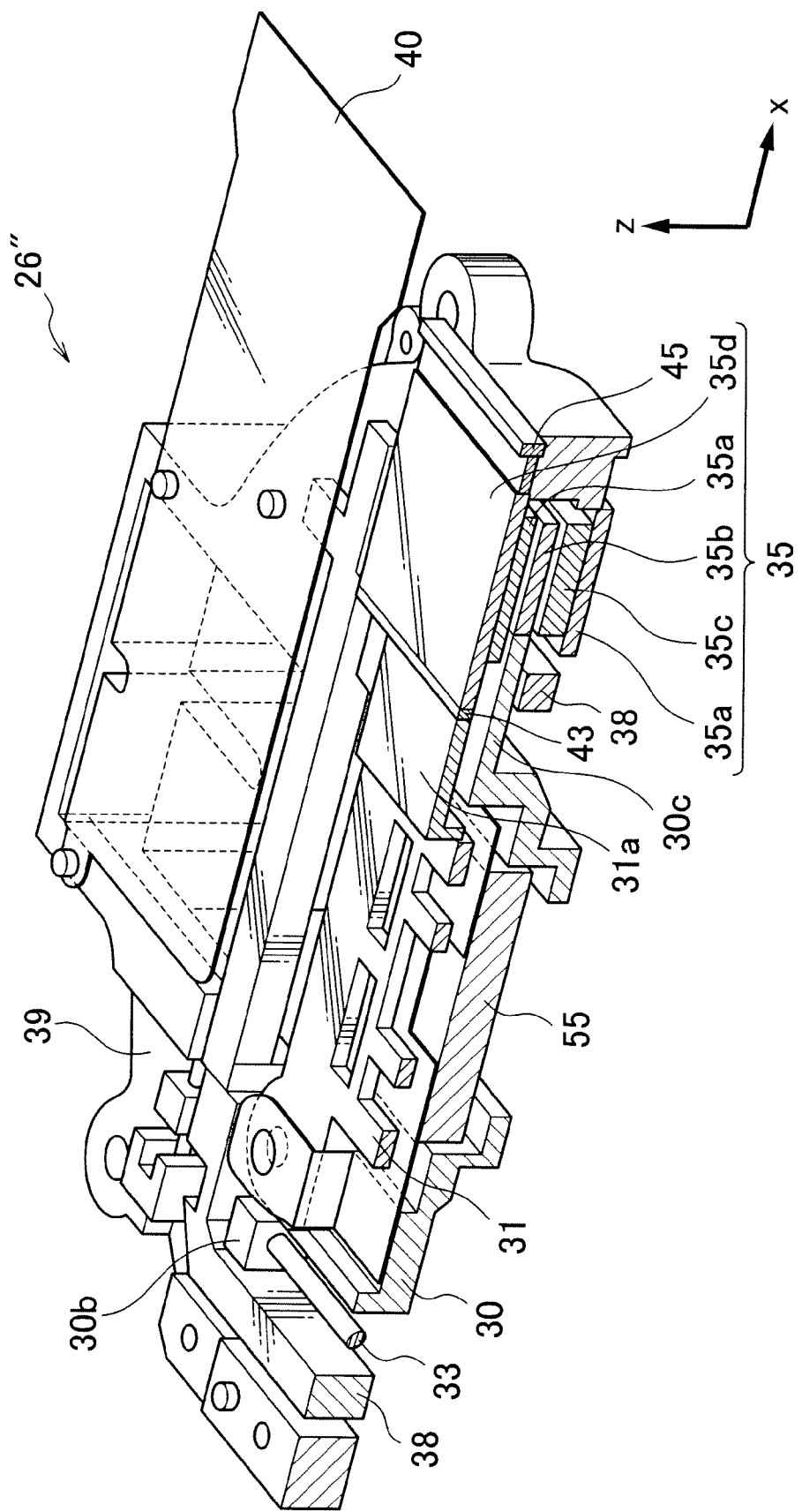

40A

40A

IMAGE PICKUP APPARATUS INCLUDING A HEAT EXHAUSTING MEMBER

BACKGROUND OF THE INVENTION

1. Field of the Invention

The presently disclosed subject matter relates to an image pickup apparatus, and particularly, to an image pickup apparatus capable of correcting an image blur caused by camera shake.

2. Description of the Related Art

In recent years, the amount of generated heat relative to an image pickup element size is increasing due to an increase in power consumption caused by compactness (downsizing) of an image pickup element, increasing pixel count, and increasing reading speed. An image pickup apparatus including: a camera shake correction mechanism that moves an image pickup element in a direction orthogonal to the optical axis to correct an image blur caused by camera shake; and a mechanism that exhausts (dissipates or releases) heat caused by heat generation of the image pickup element is proposed.

Japanese Patent Application Laid-Open No. 2008-300899 describes an image pickup apparatus that connects an image pickup element and a case (camera body) by a heat conduction member to efficiently exhaust heat of the image pickup element.

Japanese Patent Application Laid-Open No. 2004-120583 describes an image pickup apparatus that exhausts heat by filling a high heat conduction member between an image pickup element and a base portion.

Japanese Patent Application Laid-Open No. 2005-217993 describes an image pickup apparatus that exhausts heat by bringing a back side of an image pickup element into contact with a magnetic member by an electromagnet.

Japanese Patent Application Laid-Open No. 2008-64863 describes an image pickup apparatus that exhausts heat of the image pickup apparatus to the vapor phase through a fin arranged on the back side of an image pickup element.

Japanese Patent Application Laid-Open No. 2007-158664 describes an image pickup apparatus that vibrates an image pickup element to efficiently exhaust heat when the temperature detected by a temperature sensor exceeds a preset reference temperature.

SUMMARY OF THE INVENTION

However, in the arts described in Japanese Patent Application Laid-Open Nos. 2008-300899, 2004-120583 and 2008-64863, a load is imposed during the movement of the image pickup element due to an increase in weight, etc., and the effect of image blur correction by the camera shake correction mechanism may be reduced. In this way, in the camera shake correction using the method of moving the image pickup element, the driven object is enlarged if a heat exhausting member is arranged on the image pickup element. There is a problem that the actuator is also enlarged accordingly. Therefore, the arts described in Japanese Patent Application Laid-Open Nos. 2008-300899, 2004-120583 and 2008-64863 are not suitable for compact digital cameras of recent years.

In the art described in Japanese Patent Application Laid-Open No. 2005-217993, an electromagnet for moving the image pickup element needs to be arranged in addition to the actuator for image blur correction. Therefore, there is a problem of high cost, enlargement of apparatus, increase in power consumption, etc.

In the art described in Japanese Patent Application Laid-Open No. 2007-158664, the image pickup element directly exhausts heat. However, there is a problem that the heat cannot be efficiently exhausted because the image pickup element is small.

The presently disclosed subject matter has been made in view of the circumstances, and an object of the presently disclosed subject matter is to provide an image pickup apparatus capable of efficiently exhausting heat generated by an image pickup element without reducing the effect of image blur correction.

A first aspect of the presently disclosed subject matter provides an image pickup apparatus including: an image pickup element on which an image of a subject is formed; a shake detection device configured to detect a vibration applied to a main body of the image pickup apparatus; and an image blur correction device configured to perform a correction of removing an image blur of the image generated by the vibration detected by the shake detection device, the image blur correction device including: a holding member configured to hold the image pickup element; a first driving device configured to move the holding member in a direction orthogonal to an optical axis of the image pickup apparatus and move the holding member between a first position where the center of the image pickup element substantially corresponds to the optical axis and a second position where the center of the image pickup element is not located on the optical axis; a heat exhausting member arranged to be in contact with the holding member when the holding member is located at the second position; and a control device configured to drive the first driving device based on the vibration detected by the shake detection device.

According to the image pickup apparatus of the first aspect, the driving device that moves the holding member in a direction orthogonal to the optical axis moves the holding member holding the image pickup element between the first position where the center of the image pickup element substantially corresponds to the optical axis and the second position where the center of the image pickup element is not located on the optical axis. The holding member and the heat exhausting member are in contact when the holding member is located at the second position. As a result, the heat generated by the image pickup element can be exhausted through the holding member and the heat exhausting member.

A second aspect of the presently disclosed subject matter provides the image pickup apparatus according to the first aspect, wherein the first driving device is a voice coil motor, and the heat exhausting member includes at least one of a magnet and a yoke constituting the voice coil motor.

According to the image pickup apparatus of the second aspect, at least one of the magnet and the yoke constituting the voice coil motor is used as the heat exhausting member. As a result, the heat generated by the image pickup element can be efficiently exhausted without arranging an additional heat exhausting member.

A third aspect of the presently disclosed subject matter provides the image pickup apparatus according to the first or second aspect, further including an elastic member configured to press the holding member against the heat exhausting member.

According to the image pickup apparatus of the third aspect, the elastic member presses the holding member against the heat exhausting member, and the heat can be exhausted when the power is off. Furthermore, the holding member and the elastic member are not destroyed by vibration, etc., and garbage, etc. are not generated. The first driving device does not have to be driven to press the holding member against the heat exhausting member, and heat is not excessively generated.

A fourth aspect of the presently disclosed subject matter provides the image pickup apparatus according to the third aspect, wherein the elastic member is a spring arranged on the holding member.

According to the image pickup apparatus of the fourth aspect, the spring arranged on the holding member is used to press the holding member against the heat exhausting member. Therefore, the heat generated by the image pickup element can be efficiently exhausted without arranging an additional elastic member.

A fifth aspect of the presently disclosed subject matter provides the image pickup apparatus according to the third aspect, wherein the elastic member is a flexible printed circuit board arranged on the image pickup element.

According to the image pickup apparatus of the fifth aspect, the flexible printed circuit board arranged on the image pickup element is used to press the holding member against the heat exhausting member. Therefore, the heat generated by the image pickup element can be efficiently exhausted without arranging an additional elastic member.

A sixth aspect of the presently disclosed subject matter provides the image pickup apparatus according to any one of the first to fifth aspects, wherein the holding member is placed at the second position by gravity when the image pickup apparatus is held at a regular orientation and the first driving device is not driven.

According to the image pickup apparatus of the sixth aspect, the holding member is placed at the second position by gravity when the image pickup apparatus is held at the regular orientation while the first driving device is not driven. As a result, the heat can be exhausted by holding the image pickup apparatus at the regular orientation.

A seventh aspect of the presently disclosed subject matter provides the image pickup apparatus according to any one of the first to sixth aspects, further including a second driving device configured to bring the heat exhausting member into contact with the holding member.

According to the image pickup apparatus of the seventh aspect, the second driving device brings the heat exhausting member into contact with the holding member. As a result, the heat exhausting member and the holding member can be more surely brought into contact.

An eighth aspect of the presently disclosed subject matter provides the image pickup apparatus according to any one of the first to seventh aspects, wherein in the heat exhausting member, a heat-transfer elastic member is arranged to be in contact with the holding member when the holding member is located at the second position.

According to the image pickup apparatus of the eighth aspect, the heat-transfer elastic member and the holding member are in contact when the holding member is located at the second position. Since the heat-transfer elastic member and the holding member are in contact, the contact area increases, and the heat can be more efficiently exhausted.

A ninth aspect of the presently disclosed subject matter provides the image pickup apparatus according to any one of the first to eighth aspects, wherein the image pickup element is arranged on the holding member so that a heat generation unit formed on the image pickup element and the heat exhausting member are brought into contact in a shortest distance.

According to the image pickup apparatus of the ninth aspect, the image pickup element is arranged on the holding member so that the heat generation unit formed on the image pickup element and the heat exhausting member are in contact in the shortest distance. As a result, the heat can be efficiently exhausted.

A tenth aspect of the presently disclosed subject matter provides the image pickup apparatus according to the eighth aspect, wherein the image pickup element is a CCD image sensor including a horizontal transfer path as the heat generation unit.

According to the image pickup apparatus of the tenth aspect, the image pickup element is arranged on the holding member so that the horizontal transfer path and the heat exhausting member are in contact in the shortest distance. As a result, the heat can be efficiently removed from the horizontal transfer path with the greatest amount of generated heat.

An eleventh aspect of the presently disclosed subject matter provides the image pickup apparatus according to any one of the first to tenth aspects, further including: an image pickup device configured to acquire an image of a subject by the image pickup element; and a detection device configured to detect whether the image pickup device has acquired the image of the subject, wherein if the detection device does not detect the acquisition of the image of the subject, the control device drives the first driving device to move the holding member to the second position.

According to the image pickup apparatus of the eleventh aspect, the holding member is moved to the second position if the acquisition of the image of the subject is not detected. As a result, the heat can be exhausted when an image is not picked up.

A twelfth aspect of the presently disclosed subject matter provides the image pickup apparatus according to the tenth aspect, wherein the image pickup device includes an electronic zooming device configured to cut out a part of the image formed on the image pickup element to change an imaging magnification, the detection device detects whether the image of the subject in which the imaging magnification is changed by the electronic zooming device is acquired, and the control device drives the first driving device to bring the holding member into contact with the heat exhausting member if the detection device detects that the image of the subject with the changed imaging magnification is acquired and that the imaging magnification is greater than a predetermined threshold.

According to the image pickup apparatus of the twelfth aspect, the holding member is brought into contact with the heat exhausting member if the detection device detects that the image of the subject in which the imaging magnification is changed by the electronic zooming device is acquired and that the imaging magnification is greater than the predetermined threshold. As a result, the heat can be exhausted during imaging if the electronic zoom with the imaging magnification greater than the predetermined threshold is used to take an image.

A thirteenth aspect of the presently disclosed subject matter provides the image pickup apparatus according to the tenth aspect, wherein the image pickup device includes a thinning-out reading device configured to read out an image with the number of pixels smaller than the number of pixels of the image pickup element, the detection device detects whether the thinning-out reading device has acquired an image with the number of pixels smaller than the number of pixels of the image pickup element, and the control device brings the holding member into contact with the heat exhausting member if the detection device detects that the image with the number of pixels smaller than the number of pixels of the image pickup element is acquired and that the number of pixels is smaller than a predetermined threshold.

According to the image pickup apparatus of the thirteenth aspect, the holding member is brought into contact with the heat exhausting member if the thinning-out reading device that reads out the image with the number of pixels smaller than the number of pixels of the image pickup element acquires the image with the number of pixels smaller than the predetermined threshold. As a result, the heat can be exhausted during imaging if an image with the number of pixels smaller than the predetermined threshold is taken.

A fourteenth aspect of the presently disclosed subject matter provides the image pickup apparatus according to any one of the tenth to thirteenth aspects, further including a position detection device configured to detect a position of the holding member, wherein if the position detection device detects that the holding member is located at the second position and the detection device detects that the image pickup device has started acquiring the image of the subject, the control device drives the first driving device by driving force greater than driving force for driving the first driving device based on the vibration detected by the shake detection device to move the holding member to the first position.

According to the image pickup apparatus of the fourteenth aspect, if the position detection device detects that the holding member is located at the second position and the detection device detects that the image pickup device has started acquiring the image of the subject, the control device drives the first driving device by driving force greater than driving force for driving the first driving device based on the vibration detected by the shake detection device to move the holding member to the first position. As a result, a trouble that occurs as the holding member and the heat exhausting member are not separated can be prevented.

A fifteenth aspect of the presently disclosed subject matter provides the image pickup apparatus according to the first to fourteenth aspects, further including a case made of a heat-transfer material, wherein the heat exhausting member is arranged to be in contact with the case.

According to the image pickup apparatus of the fifteenth aspect, the heat exhausting member is arranged to be in contact with the case made of the heat-transfer material. As a result, the heat can be efficiently exhausted to the outside from the heat exhausting member.

According to the presently disclosed subject matter, heat generated by the image pickup element can be efficiently exhausted without reducing the effect of image blur correction.

BRIEF DESCRIPTION OF THE DRAWINGS

FIG. 10B is a schematic diagram of the image blur correction apparatus of the digital camera of the second embodiment of the presently disclosed subject matter, illustrating a state during exhausting heat

FIG. 17B is a schematic diagram of the image blur correction apparatus of another modified example of the digital camera of the third embodiment, illustrating a state during exhausting heat

DETAILED DESCRIPTION OF THE PREFERRED EMBODIMENTS

First Embodiment

Hereinafter, preferred embodiments for carrying out an image correction apparatus according to the presently disclosed subject matter will be described in detail with reference to the attached drawings.

Figure 1A:
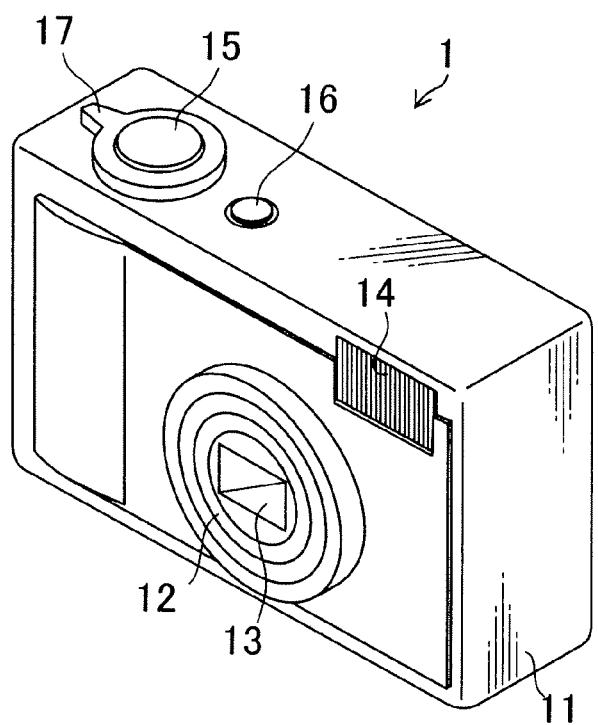
FIGS. 1A and 1B are schematic diagrams of a digital camera of a first embodiment of the presently disclosed subject matter, FIG. 1A being a front side perspective view of the digital camera, FIG. 1B being a back side perspective view of the digital camera.
Figure 1B:
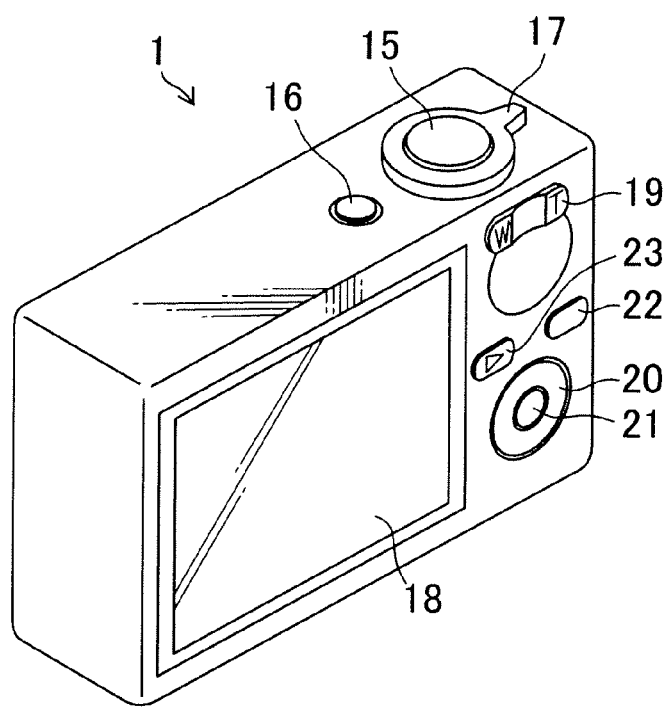

FIGS. 1A and 1B are schematic diagrams of a digital camera 1 according to a first embodiment of the digital camera 1 comprising the image blur correction apparatus according to the presently disclosed subject matter. FIG. 1A is a front side perspective view, and FIG. 1B is a back side perspective view. The digital camera 1 can record and play back not only still images, but also moving images, sounds, etc.

As illustrated in FIG. 1, a camera body 11 of the digital camera 1 is formed in a horizontally long rectangular box shape. An optical system 12, a stroboscope 14, etc. are arranged on the front side. A shutter button 15, a power button 16, a mode dial 17, etc. are arranged on the upper side of the camera body 11. Meanwhile, a monitor 18, a zoom button 19, arrow buttons 20, a MENU/OK button 21, a DISP/BACK button 22, a playback button 23, etc. are arranged on the back side of the camera body 11.

The lower surface of the camera body 11 (not illustrated) includes: tripod screw holes; and a battery insertion section and a memory card slot through a freely opened/closed cover. A battery and a memory card are loaded on the battery insertion section and the memory card slot.

The optical system 12 is included in a collapsible lens barrel. As the mode of the camera is set to an imaging mode by the power button 16, the lens cover 13 opens, and the zoom lens is drawn out from the camera body 11. Though specific configurations of the zoom mechanism and the collapsible mechanisms of the optical system 12 will not be described here, details of the optical system 12 will be described later.

A light emission unit of the stroboscope 14 is configured to be able to swing in the horizontal direction and the vertical direction to direct stroboscopic light toward a main subject.

The shutter button 15 is constituted by a two-step stroke switch including so-called "half-press" and "full-press". During still image photographing (for example, when a still image photographing mode is selected by the mode dial 17 or when the still image photographing mode is selected from the menu), the digital camera 1 executes imaging preparation processes, or processes of AE (Automatic Exposure), AF (Auto Focus), and AWB (Automatic White Balance), when the shutter button 15 is half-pressed (S1 ON) and executes a photographing and recording process of an image when the shutter button 15 is full-pressed (S2 ON). During moving image photographing (for example, when a moving image photographing mode is selected by the mode dial 17 or when the moving image photographing mode is selected from the menu), the digital camera 1 starts photographing moving images when the shutter button 15 is pressed for a long time and ends photographing the moving images when the shutter button 15 is full-pressed for a predetermined time again. The digital camera 1 can be configured to photograph moving images while the shutter button 15 is full-pressed and to end photographing the moving images when the full-press is released.

The power button 16 is a button for switching on/off of the power of the digital camera 1.

The mode dial 17 is used to switch various modes (such as imaging mode, playback mode, deletion mode, and edit mode) and to set imaging modes, such as automatic imaging and manual imaging.

The monitor 18 has a typical aspect ratio of 4:3 and is constituted by a liquid crystal display capable of color display. The monitor 18 is used as an image display panel for displaying photographed images during the playback mode and as a photographer interface display panel for various setting operations. A live view image (through image) is displayed as necessary during the imaging mode, and the monitor 18 is also used as an electronic finder for confirming the angle of view.

The zoom button 19 is used for a zoom operation of the optical system 12 and is constituted by a zoom tele button for instructing zooming to the telephoto side and a zoom wide button for instructing zooming to the wide side.

The arrow buttons 20 are buttons for selecting various settings of menu or for zooming and is configured to be able to perform pressing operations in vertical and horizontal four directions. A function corresponding to the setting state of the camera is allocated to the button in each direction. For example, during imaging, a function for switching on/off of a macro function is allocated to the left button, and a function for switching a stroboscopic mode is allocated to the right button. A function for switching the brightness of the monitor 18 is allocated to the up button, and a function for switching on/off of a self-timer is allocated to the down button. During playback, a function for frame advancing is allocated to the right button, and a function for frame rewinding is allocated to the left button. A function for switching the brightness of the monitor 18 is allocated to the up button, and a function for deleting an image being played back is allocated to the down button. During various settings, a function for moving the cursor displayed on the monitor 18 in directions of the buttons is allocated.

The MENU/OK button 21 is used to call out the menu screen (MENU function), confirm the selected content, instruct the execution of process, etc. (OK function). Functions allocated in accordance with the setting state of the digital camera 1 are switched. On the menu screen, all adjustment items included in the digital camera 1 are set, the items including image quality adjustment, such as exposure value, hue, photographic sensitivity (ISO sensitivity), and the number of recorded pixels, as well as setting of self-timer, switching of light measurement system, whether to use digital zooming, etc. The digital camera 1 operates in accordance with the conditions set on the menu screen.

The DISP/BACK button 22 is used to input an instruction to switch the display content of the monitor 18, etc. and to input an instruction to cancel the input operation, etc.

The playback button 23 is used to instruct switching to the playback mode.

Details of the optical system 12 will be described hereafter. The optical system 12 mainly includes an aperture, a focus lens, a zoom lens (which are not illustrated), and an image blur correction apparatus 24.

The image blur correction apparatus 24 detects shaking of the digital camera 1 by gyro sensors 71 and 74 (see FIG. 5) and moves an image pickup element 55 (see FIG. 5) in the direction opposite the shaking of the digital camera 1 to correct the image blur of the subject image formed in the image pickup element 55.

Figure 2:
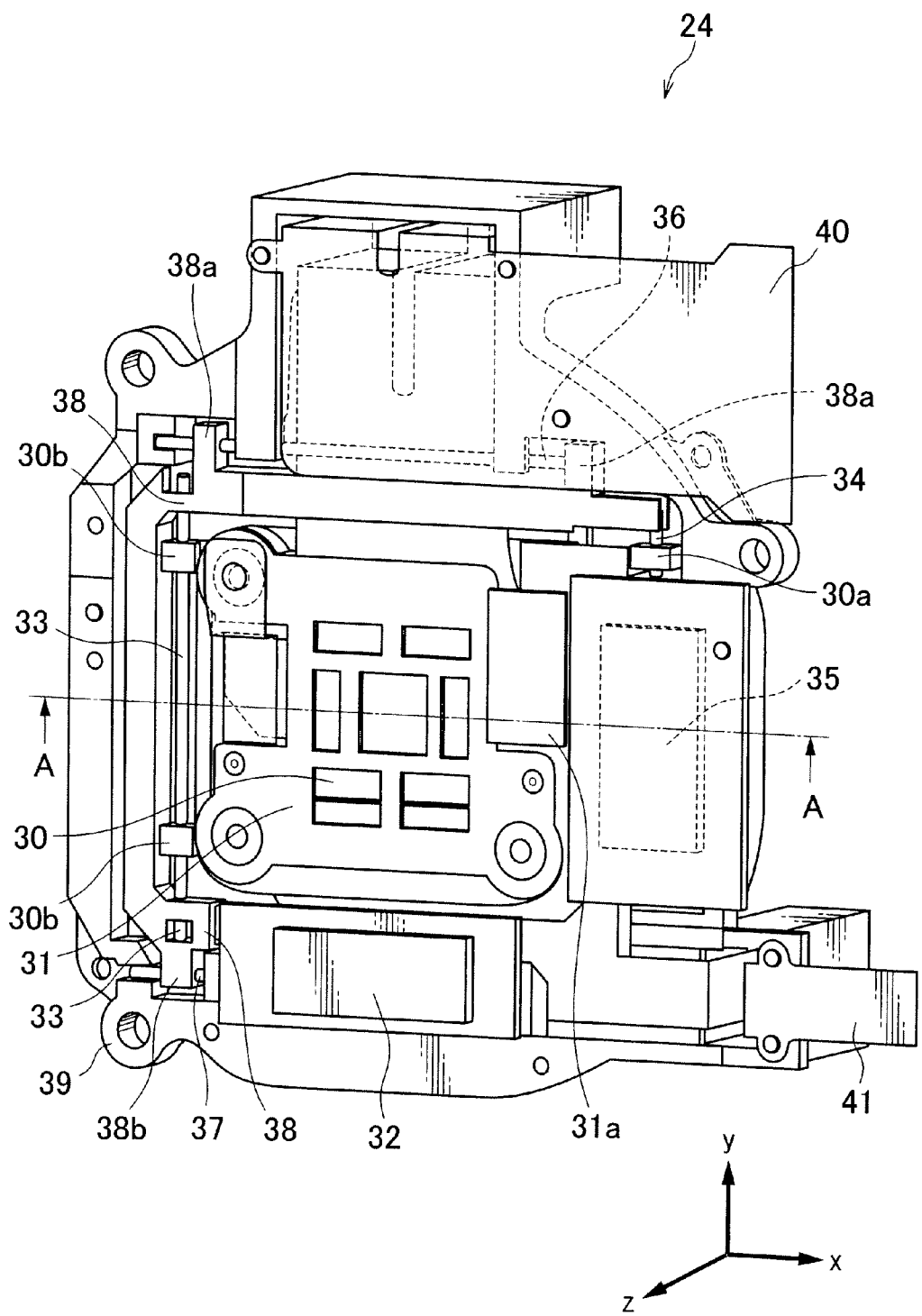
FIG. 2 is a schematic diagram of an image blur correction apparatus.

FIG. 2 is a diagram illustrating an outline of the image blur correction apparatus 24 when the image pickup element 55 is on the optical axis (position substantially corresponding to the optical axis), while the digital camera 1 is held at a regular orientation (orientation of FIG. 1A). As illustrated in FIG. 2, the image blur correction apparatus 24 includes a CCD (charge-coupled device) case 30, a CCD plate 31, a voice coil motor 32, a main guide axis 33, a rotation stopping guide axis 34, a voice coil motor 35, a main guide axis 36, a rotation stopping guide axis 37, a slider 38, a frame 39, a main flexible substrate 40, and a flexible substrate 41 for voice coil motor.

The CCD case 30 is a resin member for holding the image pickup element 55. A bearing 30a is formed near the right side (+x side) upper end (+y side) of the CCD case 30, and the rotation stopping guide axis 34 is inserted. Bearings 30b are formed at two parts on the left side (−x direction) of the CCD case 30, and the main guide axis 33 is inserted to the bearings 30b.

The CCD plate 31 is a metallic plate-like member and is used for tilt adjustment, etc. The CCD plate 31 is screwed on the front side (+z side) of the CCD case 30 so as to cover the CCD case 30. A hole is formed at substantially the center of the CCD plate 31, and the image pickup element 55 is exposed from the hole. At the right end of the CCD plate 31, a rib-like convex portion 31a is formed along the edge of the right side of FIG. 2.

Figure 5:
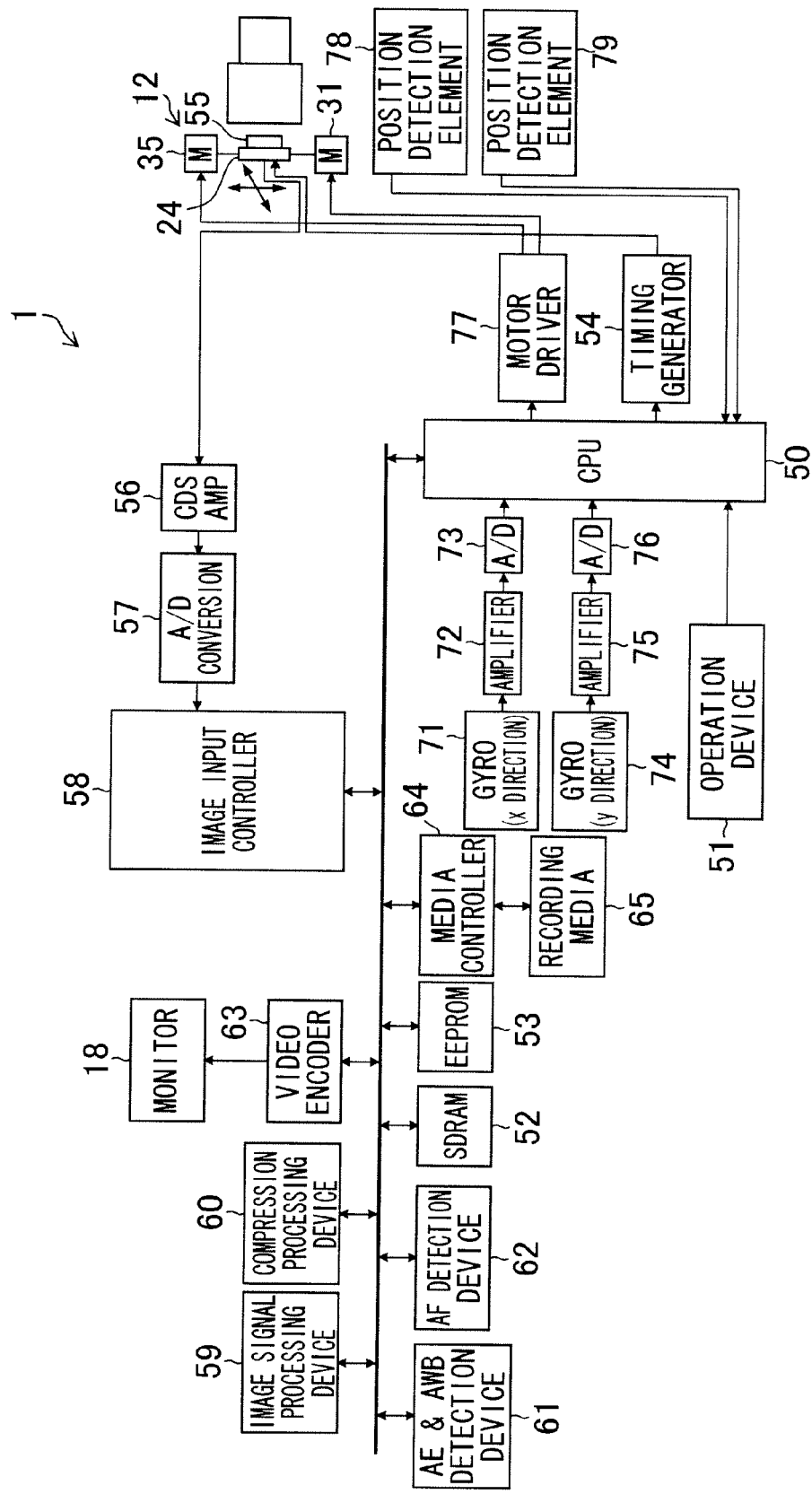
FIG. 5 is a block diagram illustrating an electric configuration of the digital camera of the first embodiment.

The voice coil motors 32 and 35 are driven according to a signal outputted from a motor driver 77 (see FIG. 5). The voice coil motor 32 moves the CCD case 30 and the CCD plate 31 in the y direction, and the voice coil motor 35 moves the CCD case 30, the CCD plate 31, and the slider 38 in the x direction. The structures of the voice coil motors 32 and 35 are the same except that a heat exhausting (dissipating or releasing) member 35d (described in detail later) is not arranged on the voice coil motor 32. Therefore, the voice coil motor 35 will be described.

Figure 3:
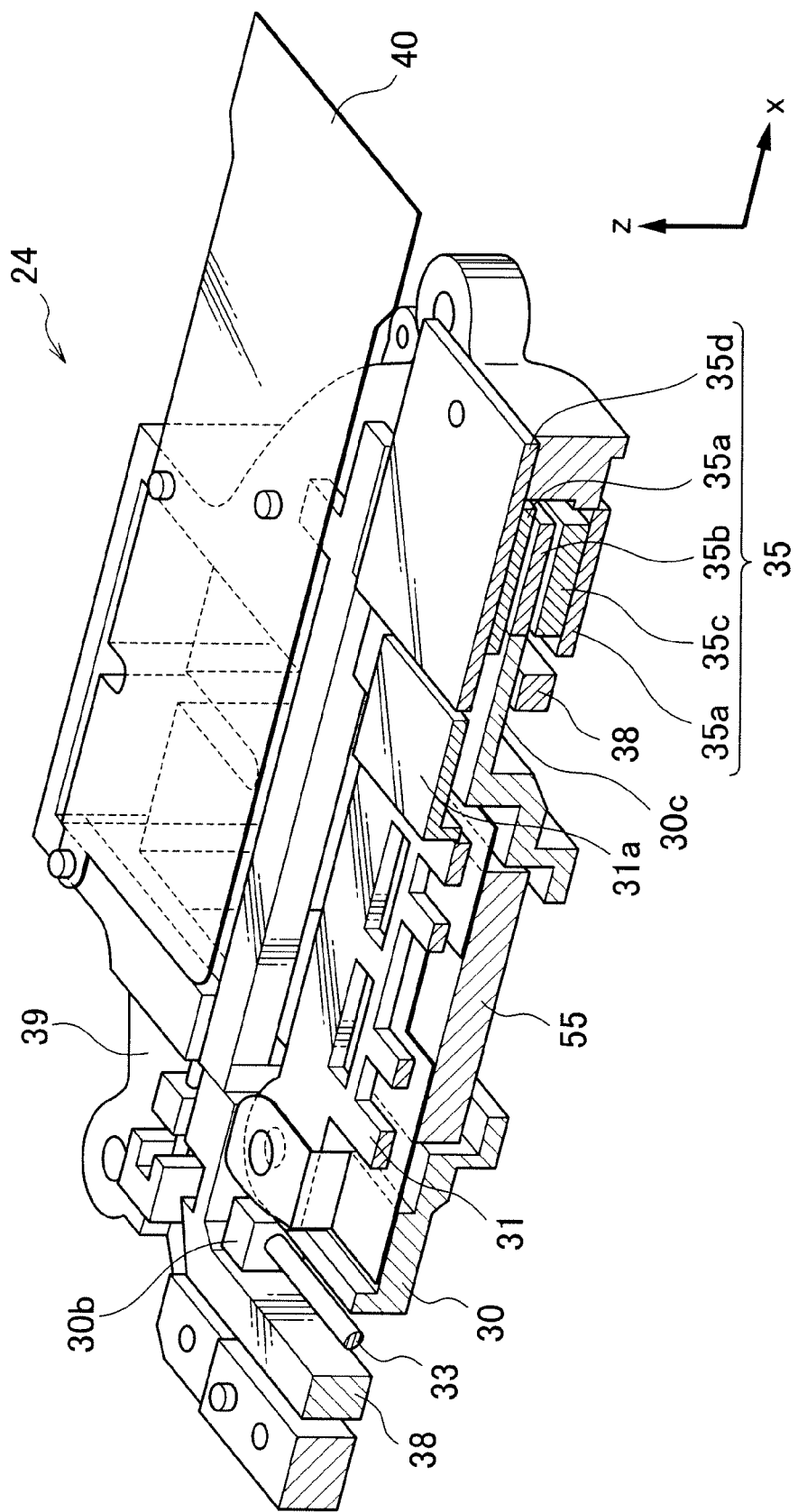
FIG. 3 is an A-A cross-sectional view of the image blur correction apparatus during imaging.

FIG. 3 is an A-A cross section of FIG. 2. The voice coil motor 35 includes yokes 35a, a coil 35b, a magnet 35c, and a heat exhausting member 35d.

The yokes 35a are metallic plates fixed to the frame 39. The yokes 35a are designed to reduce the flux leakage by the magnet 35c and strengthen the magnetic field between the yokes 35a. One of the yokes 35a is arranged adjacent to the magnet 35c, and the other yoke 35a is arranged at a position sandwiching the coil 35b and the magnet 35c by the yokes 35a. The metallic heat exhausting member 35d is integrally formed on the front side of the other yoke 35a.

The magnet 35c is a magnet, both sides of which are multipolar, and is arranged adjacent to the front side of the yokes 35a. In the magnet 35c, an upward (+z direction) magnetic field is generated on the left side (−x side) of FIG. 3 and a downward (−z direction) magnetic field is generated on the right side (+x side) (see arrows in FIG. 3). The directions of the magnetic fields illustrated in FIG. 3 are examples and are not limited to these.

The coil 35b is a cylindrical air core coil that is fixed at the edge of the CCD plate 31 and that has a substantially rectangular cross section. The helix direction of the coil 35b is counterclockwise as seen from the +z direction, and the coil 35b is formed to overlap in the optical axis direction (z direction). The helix direction of the coil 35b is an example and is not limited to this. The coil 35b is fixed to a convex portion 30c formed on the right side of the CCD case 30 and is arranged in the magnetic field by the magnet 35c. Therefore, when an electric current is applied to the coil 35b, force in the vertical direction of both the magnetic field and the electric current is generated due to the Fleming's left-hand rule. Since the magnet 35c is fixed to the frame 39, the magnet 35c moves in the vertical direction of both the magnetic field and the electric current, i.e. in the x direction, by the force. Accordingly, the CCD case 30 and the CCD plate 31, i.e. the image pickup element 55, also move in the x direction.

Figure 4:
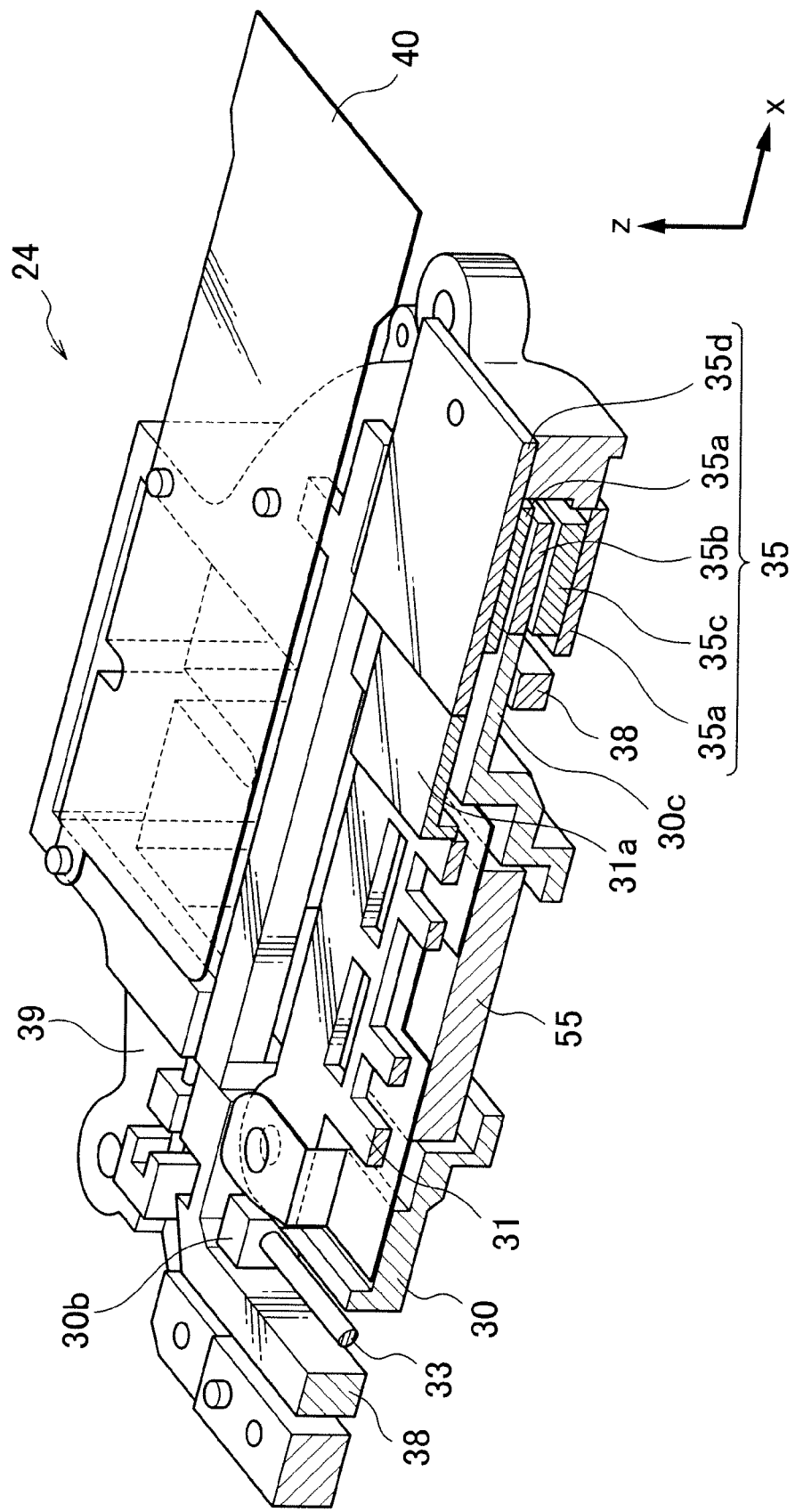
FIG. 4 is an A-A cross-sectional view of the image blur correction apparatus during exhausting heat

FIG. 4 illustrates a state after the CCD case 30 and the CCD plate 31 have moved in the +x direction to the maximum from the state in which the image pickup element 55 illustrated in FIG. 3 is on the optical axis. The CCD case 30 and the CCD plate 31 can move to the position where the convex portion 31a and the heat exhausting member 35d are in contact. The heat generated by the image pickup element 55 is transferred to the CCD plate 31 through the CCD case 30. As the convex portion 31a and the heat exhausting member 35d are in contact, the heat transferred to the CCD plate 31 is transferred to the heat exhausting member 35d (see an arrow in FIG. 4) and exhausted into the air from the heat exhausting member 35d.

The main guide axis 33 is an axis for moving the CCD case 30 and the CCD plate 31 in the y direction. The main guide axis 33 is inserted to the bearings 30b and fixed to the slider 38. The rotation stopping guide axis 34 is designed to stop the CCD case 30 and the CCD plate 31 from rotating around the main guide axis 33. The rotation stopping guide axis 34 is inserted to a through hole 30b and fixed to the slider 38. The main guide axis 33 and the rotation stopping guide axis 34 are arranged at both sides of the image pickup element 55 in parallel.

The slider 38 is a substantially square-shaped member that moves the CCD case 30 and the CCD plate 31 in the x direction. As the slider 38 is substantially square-shaped, the strength of the slider 38 is maintained. Bearings 38a are formed at two parts near both ends on the upper side (+y direction) of the slider 38, and the main guide axis 36 is inserted. A bearing 38b is formed near the lower side (−y direction) left end (−x direction) of the slider 38, and the rotation stopping guide axis 37 is inserted.

The main guide axis 36 is an axis for moving the slider 38 in the x direction. The main guide axis 36 is inserted to the bearings 38a and is fixed to the frame 39. As the bearings 38a move along the main guide axis 36, the slider 38 moves in the x direction. The rotation stopping guide axis 37 is designed to stop the slider 38 from rotating around the main guide axis 36. The rotation stopping guide axis 37 is inserted to the bearing 38b and fixed to the frame 39. The main guide axis 36 and the rotation stopping guide axis 37 are arranged at both sides of the image pickup element 55 in parallel.

The frame 39 is a member for fixing the main guide axis 36 and the rotation stopping guide axis 37 inside the camera body 11.

The main flexible substrate 40 and the flexible substrate 41 for voice coil motor are bendable thin substrates. The main flexible substrate 40 supplies power to the image pickup element 55 and electrically connects a main substrate not illustrated and the image pickup element 55. The flexible substrate 41 for voice coil motor supplies power to the voice coil motors 32 and 35 and electrically connects the main substrate not illustrated and the voice coil motors 32 and 35.

An electric configuration of the digital camera 1 will be described. As illustrated in FIG. 5, the digital camera 1 includes a CPU (central processing unit) 50, an operation device (the shutter button 15, the power button 16, the mode dial 17, the zoom button 19, the arrow button 20, the MENU/OK button 21, the DISP/BACK button 22, the playback button 23, etc.) 51, an SDRAM (synchronous dynamic random access memory) 52, an EEPROM (electrically erasable programmable read-only memory) 53, a timing generator (TG) 54, the image pickup element 55, an analog signal processing device (CDS/AMP) 56, an A/D (analog-to-digital) converter 57, an image input controller 58, an image signal processing device 59, a compression/decompression processing device 60, an AE/AWB detection device 61, an AF detection device 62, a video encoder 63, a media controller 64, the gyro sensors 71 and 74, amplifiers 72 and 75, A/D converters 73 and 76, the motor driver 77, and position detection elements 78 and 79.

The CPU 50 functions as a control device that comprehensively controls the entire operation of the digital camera 1, functions as a computation device that executes various computation processes, and controls the components of the digital camera 1 according to predetermined control programs based on input from an operation device 121, etc.

The SDRAM 52 is used as a working area of the CPU 50 and as a temporary storage area of image data, etc.

The EEPROM 53 is a non-volatile memory and stores programs for various controls, setting information, etc. The main CPU 50 executes various processes based on the programs and the setting information.

The TG 54 controls an optical charge storage/transfer operation of the image pickup element 55. A timing signal (clock pulse) inputted from the TG 54 determines the electronic shutter speed (optical charge storage time).

Figure 6:
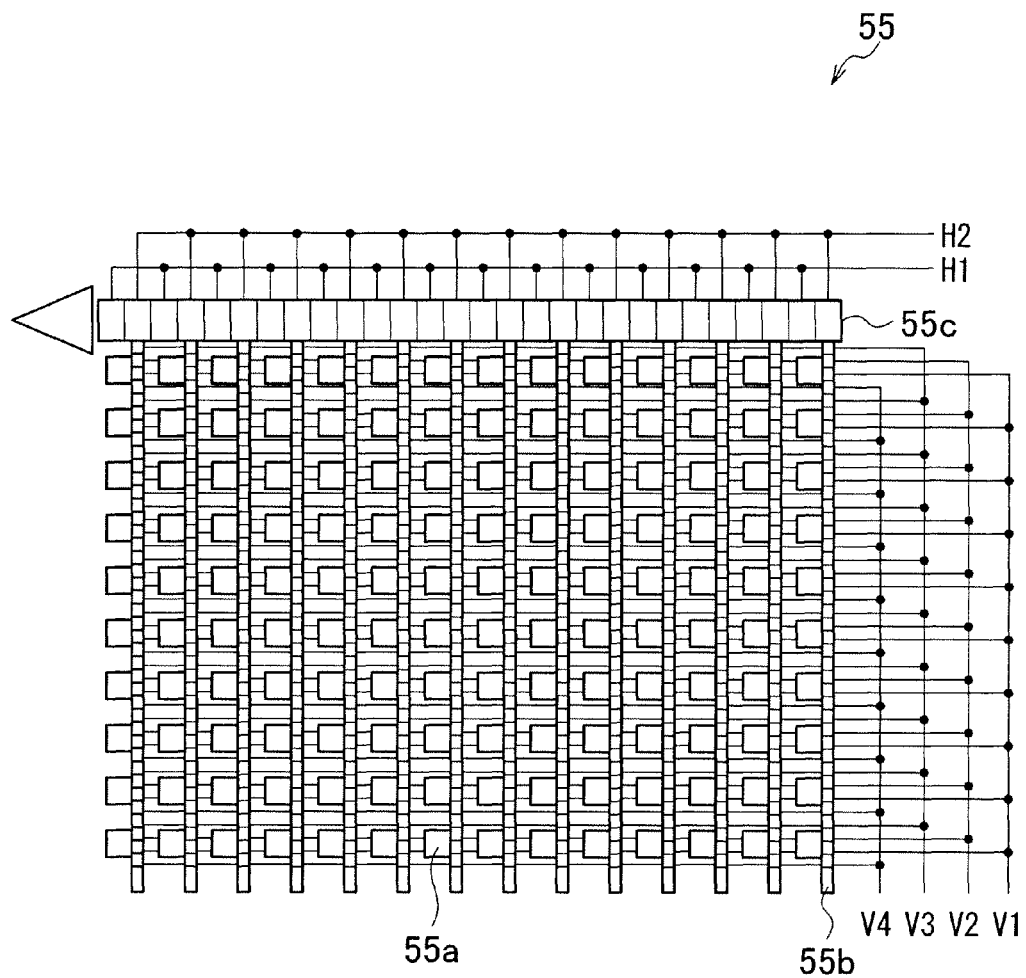
FIG. 6 is a schematic diagram of an image pickup element.

The image pickup element 55 is a CCD image sensor arranged on the lens optical axis and electronically picks up an image of a subject formed by a zoom lens, a focus lens, etc. As illustrated in FIG. 6, a multiplicity of photodiodes 55a are two-dimensionally aligned on the light receiving surface of the image pickup element 55, and each photodiode 55a converts the subject light directed to the light receiving surface into a signal charge in an amount corresponding to the incident light amount. The signal charge accumulated on the photodiodes 55a is read out according to a timing pulse provided from the TG 54, shifted upward of FIG. 6 on a vertical transfer path 55b, transferred to a horizontal transfer path 55c, transferred to the left on the horizontal transfer path 55c, and converted to a voltage signal by an amplifier. As a result, the voltage signal (image signal) corresponding to the signal charge is outputted. The imaging signals outputted from the image pickup element 55 are inputted to the analog signal processing device 56.

The frequency of the voltage signals applied to H1 and H2 that drive the horizontal transfer path 55c is higher and the power consumption is higher than those of the voltage signals applied to V1 to V4 that drive the vertical transfer path 55b. Therefore, the horizontal transfer path 55c generates the greatest heat in the image pickup element 55. In the present embodiment, the CCD case 30, the CCD plate 31, and the slider 38 are moved in the x direction, and the heat is exhausted from the voice coil motor 35. Therefore, the image pickup element 55 is arranged in the CCD case so that the horizontal transfer path 55c that generates the most heat and the heat exhausting member are brought into contact in a shortest distance and that the horizontal transfer path 55c is located in the +x direction.

The analog signal processing device 56 applies a correlated dual sampling process (a process of calculating a difference between a feedthrough component level and a pixel signal component level included in an output signal of each pixel of the image pickup element to obtain accurate pixel data in order to reduce noise (especially thermal noise), etc. included in the output signal of the image pickup element) to each image signal outputted from the image pickup element 55 to amplify and output the image signal.

The A/D converter 57 converts the inputted image data from analog to digital. The image pickup element 55 of the optical system 12 is outputted as image data through the A/D converter 57.

The image input controller 58 includes a buffer memory (line buffer) with predetermined capacity. In accordance with a command from the CPU 50, the image input controller 58 accumulates image signals of one image outputted from the A/D converter 57 and records the image signals in the SDRAM 52.

The image signal processing device 59 includes a synchronization (signal interpolating) circuit (a processing circuit that interpolates spatial deviation of color signals associated with single-plate CCD color filter alignment to synchronously convert the color signals), a white balance correction circuit, a gamma correction circuit, a contour correction circuit, a luminance/color difference signal generation circuit, etc. The image signal processing device 59 applies required signal processing to the image data inputted from the A/D converter 57 to generate image data (YUV data) including luminance data (Y data) and color difference data (Cr, Cb data) and outputs the image data to the video encoder 63 for display. When the image signal processing device 59 is used as an electronic view finder in the imaging mode, the generated image data is displayed as a live view image (through image) on the monitor 18 through the video encoder 63. The image signal processing device 59 further converts the image data taken by the image pickup element 55 and the YC signal of the image data taken by the image pickup element 55 into a video signal of a predetermined system (for example, color complex video signal of an NTSC (National Television System Committee) system) and then composes stereoscopic image data to be stereoscopically displayed by an external stereoscopic image display device, etc.

In accordance with a command from the CPU 50, the compression/decompression processing device 60 applies a compression process in a predetermined format to the inputted image data to generate compressed image data. The compression/decompression processing device 60 further applies a compression process to the image data stored in the SDRAM 52 in accordance with a predetermined compression format, such as JPEG (Joint Photographic Experts Group) for still images, MPEG2 (Moving Picture Experts Group 2), MPEG4, or H.264 system for moving images. The compression/decompression processing device 60 stores data of two-dimensional still images in recording media 65 as an image file (the image file will be described in detail later) in a predetermined format such as an Exif (Exchangeable image file format) file. The Exif file includes an area for storing data of main images and an area for storing data of reduced images (thumbnail images). Thumbnail images in a prescribed size (for example, 160×120 or 80×60 pixels) are generated from the data of the main images acquired by imaging, through a thinning-out process of pixels and other necessary data processing. The generated thumbnail images are written in the Exif file along with the main images. Tag information, such as photographed date/time, photographed conditions, and face detection information, is attached to the Exif file.

When a release switch is half-pressed during an imaging standby state, the AE/AWB detection device 61 calculates physical quantity necessary for AE control and AWB control from the inputted image signals in accordance with a command from the CPU 50. For example, for the physical quantity necessary for AE control, one screen is divided into a plurality of areas (for example, 16×16), and an integrated value of R (red), G (green), and B (blue) image signals is calculated in each divided area. The CPU 50 detects brightness of the subject (subject luminance) based on the integrated value obtained from the AE/AWB detection device 61 to calculate an exposure value (imaging EV value) suitable for imaging. The aperture value and the shutter speed are determined from the calculated imaging EV value and a predetermined program diagram.

The AE/AWB detection device 61 divides one screen into a plurality of areas (for example, 16×16) and calculates an average integrated value of each color of R, G, and B image signals in each divided area which is one of the physical quantity necessary for AWB control. The CPU 50 calculates ratios of R/G and B/G in each divided area from the obtained integrated value of R, integrated value of B, and integrated value of G and determines the light source type based on the distribution of the obtained values of R/G and B/G in the color spaces of R/G and B/G. In accordance with a white balance adjustment value suitable for the determined light source type, a gain value (white balance adjustment value) for the R, G, and B signals of the white balance adjustment circuit is determined so that, for example, the values of the ratios are about 1 (in other words, the integration ratio of RGB is R:G:B≈1:1:1 in one screen).

When the release switch is half-pressed during the imaging standby state, the AF detection device 62 calculates physical quantity necessary for AF control from the inputted image signals in accordance with a command from the CPU 50. In the digital camera 1 of the present embodiment, AF control is performed based on the contrast of the image obtained from the image pickup element 55 (so-called contrast AF), and the AF detection device 62 calculates a focus evaluation value indicating the sharpness of the image from the inputted image signals. The CPU 50 detects a position where the focus evaluation value calculated by the AF detection device 62 is local maximum and moves the focus lens group to the position. More specifically, the CPU 50 moves the focus lens group from the closest range to the infinity by predetermined steps, acquires a focus evaluation value at each position, sets the position in which the obtained focus evaluation value is maximum as a focused position, and moves the focus lens group to the position.

The video encoder 63 outputs the RGB signals outputted from the image signal processing device 59 to the monitor 18.

The media controller 64 records the image data compressed by the compression/decompression processing device 60 in the recording media 65 or other recording media connected through the media controller 64.

The recording media 65 are various recording media, such as a semiconductor memory card, a portable compact hard disk, a magnetic disk, an optical disk, and a magneto-optical disk, represented by xD Picture Card (registered trademark) and Smart Media (registered trademark) removable from the digital camera 1.

A power battery is removably arranged on the digital camera 1. The power battery is constituted by a chargeable second battery, such as a NiCad battery, a nickel hydrogen battery, and a lithium ion battery. The power battery may be constituted by a non-chargeable primary battery, such as a lithium battery and an alkaline battery. The power battery is loaded on a battery storage chamber not illustrated and electrically connected to the devices of the digital camera 1.

The gyro sensors 71 and 74 are sensors that detect the angular velocity of the digital camera 1 and that detect a vibration of the digital camera 1 due to camera shake. The gyro sensor 71 detects the acceleration in the x direction (see FIG. 2), and the gyro sensor 74 detects the acceleration in the y direction (see FIG. 2).

The amplifiers 72 and 75 amplify the signals detected by the gyro sensors 71 and 74 and output the signals to the A/D converters 73 and 76.

The A/D converters 73 and 76 respectively convert the signals amplified by the amplifiers 72 and 75 to digital signals and input the converted signals to the CPU 50. The CPU 50 amplifies the signals inputted from the gyro sensors 71 and 74 and outputs the signals to the motor driver 77.

The motor driver 77 drives the voice coil motors 32 and 35 based on the signals inputted from the CPU 50.

The position detection elements 78 and 79 are, for example, hall elements and detect the position of the CCD plate 31. The position detection element 78 detects the position in the y direction, and the position detection element 79 detects the position in the x direction. The position detection element 78 detects the position every time the slider 38 moves in the y direction, and the position detection element 79 detects the position every time the CCD plate 31 moves in the x direction.

Figure 7:
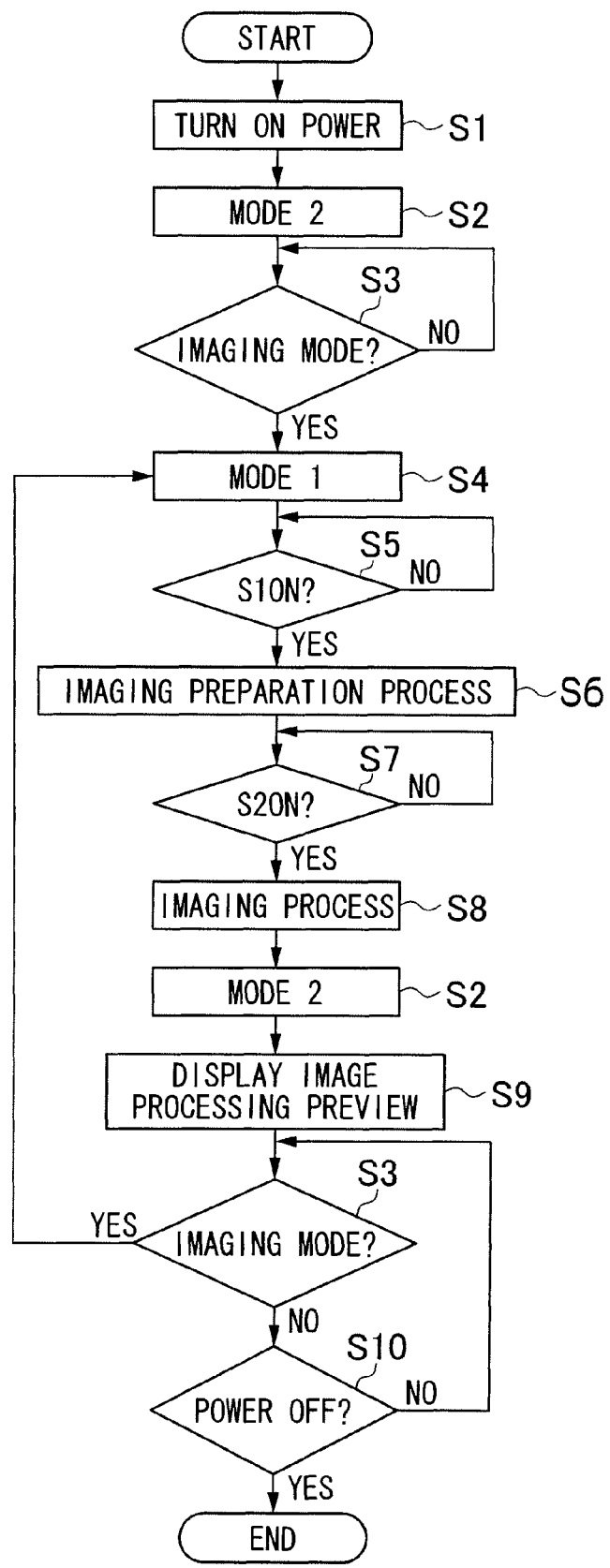
FIG. 7 is a flow chart illustrating a flow of a process of the digital camera of the first embodiment.

Actions of the digital camera 1 configured this way will be described. FIG. 7 is a flow chart illustrating a flow of a process of the digital camera 1. The CPU 50 mainly executes the following process.

Figure 8A:
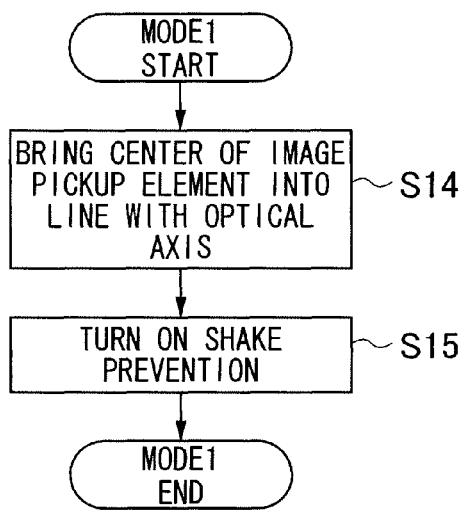
FIG. 8A is a flow chart illustrating a flow of a process of a mode 1 of the digital camera of the first embodiment.
Figure 8B:
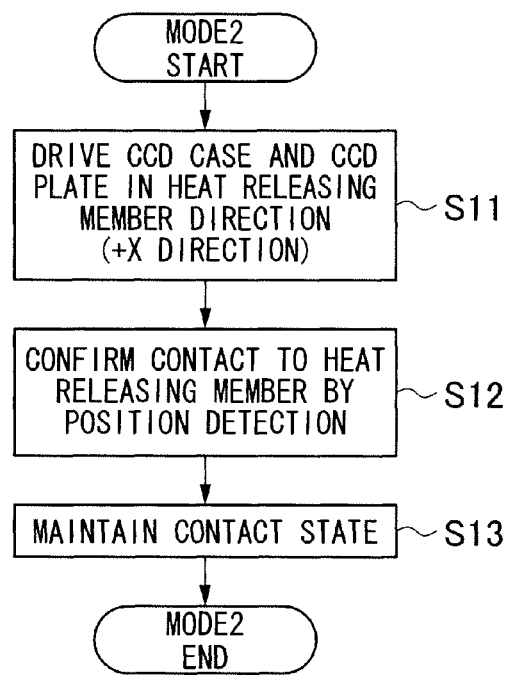
FIG. 8B is a flow chart illustrating a flow of a process of a mode 2 of the digital camera of the first embodiment.

When the power button is pressed to turn on the power of the digital camera 1 (step S1), the CPU 50 drives the image blur correction apparatus 24 in a mode 2 (step S2). As illustrated in FIG. 8B, in step S2, the CPU 50 applies an electric current to the coil 35*b* to drive the voice coil motor 35 to thereby move the CCD case 30 and the CCD plate 31 in the +x direction and brings the convex portion 31*a* into contact with the heat exhausting member (step S11). The position detection element 79 detects the position of the CCD plate 31 (step S12). When the position detection element 79 detects that the convex portion 31*a* and the heat exhausting member 35*d* are in contact and the detection signal is inputted to the CPU 50, the CPU 50 applies an electric current to the coil 35*b* and drives the voice coil motor 35 to terminate the CCD case 30 and the CCD plate 31 while the convex portion 31*a* and the heat exhausting member 35*d* are in contact (step S13).

The CPU 50 detects whether the operation mode of the digital camera 1 is the imaging mode (step S3). If the digital camera 1 is not in the imaging mode (NO in step S3), step S3 is executed again.

If the digital camera 1 is in the imaging mode (YES in S3), the image blur correction apparatus 24 is driven in the mode 1 to perform image blur correction concurrently with photographing of the live view image (step S4).

The process of step S4 will be described. The CPU 50 first uses the position detection element 79 to detect the position in the x direction and applies an electric current to the coil 35*b* if the center of the image pickup element 55 and the optical axis do not correspond to bring the center of the image pickup element 55 into line with the optical axis (step S14). Subsequently, the image pickup element 55 consecutively picks up images and consecutively processes the image signals to generate image data for live view image. The generated image data is sequentially inputted to the video encoder 63, converted into a signal format for display, and outputted to the monitor 18. This starts photographing for through image by the image pickup element 55.

After the start of through image photographing, the CPU 50 executes a shake prevention process of correcting an image blur of a subject image picked up by the image pickup element 55 caused by vibration (such as camera shake) applied to the digital camera 1 (step S15), as described below.

When the gyro sensors 71 and 74 detect a vibration in the x direction and the y direction, the detection signal is inputted to the CPU 50 through the amplifiers 72 and 75 and the A/D converters 73 and 76. The CPU 50 drives the voice coil motor 35 through the motor driver 77 based on the signal inputted from the gyro sensor 71. The CPU 50 also drives the voice coil motor 32 through the motor driver 77 based on the signal inputted from the gyro sensor 74. When the voice coil motors 32 and 35 are driven, the position detection elements 78 and 79 detect the positions in the y direction and the x direction and output the result to the CPU 50. The CPU 50 controls the voice coil motors 32 and 35 so that the position inputted from the position detection elements 78 and 79 becomes the target position. This allows an appropriate shake prevention operation.

The CPU 50 determines whether the shutter button 15 is half-pressed, in other words, whether an S1 ON signal is inputted to the CPU 50 (step S5). If the S1 ON signal is not inputted (NO in step S5), step S5 is executed again. If the S1 ON signal is inputted (YES in step S5), the following imaging preparation processes, in other words, AE, AF, and AWB processes, are executed in response to the S1 ON signal (step S6).

The image signal imported from the image pickup element 55 is inputted to an AF detection device 138 and an AE/AWB detection device 139. The data of an integrated value calculated by the AF detection device 138 is reported to the CPU 50.

The CPU 50 computes focus evaluation values (AF evaluation values) at a plurality of AF detection points while moving the focus lens group of the optical system 12 and determines the lens position where the evaluation value is local maximum as the focused position. The CPU 50 moves the focus lens group to the calculated focused position.

The CPU 50 detects the brightness of the subject (subject luminance) based on the integrated value obtained from the AE/AWB detection device 139 and calculates an exposure value (imaging EV value) suitable for imaging. The CPU 50 then determines the aperture value and the shutter speed from the calculated EV imaging value and a predetermined program diagram and controls the electronic shutter and the aperture of the image pickup element 55 according to the aperture value and the shutter speed to obtain an appropriate amount of exposure. At the same time, whether light emission of stroboscope 14 is necessary is determined from the detected subject luminance.

During automatic white balance adjustment, the AE/AWB detection device 139 calculates an average integrated value of each color of R, G, and B signals in each divided area and provides the calculation result to the CPU 50. The CPU 50 calculates ratios of R/G and B/G in each divided area from the obtained integrated value of R, integrated value of B, and integrated value of G and determines the light source type based on the distribution of the calculated values of R/G and B/G in the color spaces of R/G and B/G. In accordance with a white balance adjustment value suitable for the determined light source type, a gain value (white balance correction value) for the R, G, and B signals of the white balance adjustment circuit is controlled so that, for example, the values of the ratios are about 1 (in other words, the integration ratio of RGB is R:G:B≈1:1:1 in one screen), and the signal of each channel is corrected.

In this way, the AE/AF process is executed by the half-press of the shutter button 15. The photographer operates the zoom button 19 as necessary to zoom the lens 14 to adjust the angle of field.

The CPU 50 determines whether the shutter button 15 is full-pressed, in other words, whether an S2 ON signal is inputted to the CPU 50 (step S7). If the S2 ON signal is not inputted (NO in step S7), step S5 is executed again. If the S2 ON signal is inputted (YES in step S7), the following imaging process and recording process (step S8) are executed in response to the S2 ON signal.

The image pickup element 55 is first exposed by the aperture value and the shutter speed obtained in the AE process to pick up an image for recording. The image signals outputted from the image pickup element 55 are imported through the analog signal processing device 56, the A/D converter 57, and the image input controller 58 and stored in the SDRAM 52. Under the control of the CPU 50, the image signals stored in the SDRAM 52 are inputted to the image signal processing device 59. The image signal processing device 59 applies predetermined signal processing to the inputted image signals to generate image data (YUV data) including luminance data and color difference data.

The image data generated by the image signal processing device 59 is temporarily stored in the SDRAM 52 and then inputted to the media controller 64. The media controller 64 applies predetermined compression processing to the inputted image data to generate compressed image data.

The compressed image data is stored in the SDRAM 52 and recorded in the recording media 65 through the media controller 64 as a still image file (for example, Exif) in a predetermined format.

When the imaging process and the storage process (step S8) are executed, the CPU 50 drives the image blur correction apparatus 24 in the mode 2 (step S2). As a result, the convex portion 31a of the CCD plate 31 touches the heat exhausting member 35d, and the heat generated by the image pickup element 55 in the imaging preparation process (step S7) and the imaging process (step S8) is exhausted from the heat exhausting member 35d.

The CPU 50 inputs the compressed image data generated in step S8 to the compression/decompression processing device 60, converts the compressed image data to uncompressed image data, inputs the image data to the SDRAM 52, and performs preview display by outputting the image data from the SDRAM 52 to the monitor 18 through the video encoder 63 (step S9). The image blur correction apparatus 24 is driven in the mode 2 during the preview display (step S9), and the heat is continuously exhausted.

The CPU 50 detects whether the operation mode of the digital camera 1 is the imaging mode (step S3). If the digital camera 1 is in the imaging mode (YES in S3), the image blur correction apparatus 24 is driven in the mode 1 to perform image blur correction concurrently with photographing of the through image (step S4). In this way, even in the continuous imaging, the image blur correction apparatus 24 is driven in the mode 2 until just before (step S2). Therefore, an increase in the temperature of the image pickup element 55 can be prevented, and the noise of image caused by heat can be reduced.

If the digital camera 1 is not in the imaging mode (NO in step S3), whether the power is off is determined (step S10). If the power is not off (NO in step S10), step S3 is executed again. If the power is off (YES in step S3), the process ends.

Other than the preview display (step S9), the image taken in step S8 can be confirmed. When the playback button 23 is pressed, the CPU 50 switches the digital camera 1 to the playback mode. The CPU 50 reads out the compressed image data of the image file recorded lastly. If the lastly recorded image file is recorded in the recording media 65, the CPU 50 reads out the compressed image data of the image file lastly recorded in the recording media 65 through the media controller 64.

The compressed image data read out from the recording media 65 is inputted to the compression/decompression processing device 60, converted to uncompressed image data, and then inputted to the SDRAM 52. The data is outputted from the SDRAM 52 to the monitor 18 through the video encoder 63. As a result, images recorded in the recording media 65 or a flash ROM 114 are played back and displayed on the monitor 18. The image blur correction apparatus 24 is driven in the mode 2 during the process (step S2). Therefore, an increase in the temperature of the image pickup element 55 can be prevented.

According to the present embodiment, additional components are not necessary, and the load is not imposed on the driven objects. Therefore, the mass of the driven objects does not increase in the image blur correction. As a result, the shake prevention performance is not degraded, and the heat generated in the image pickup element can be efficiently exhausted.

Furthermore, in the present embodiment, the shake prevention process is turned off when the preview display is performed after imaging, and the CCD plate and the heat exhausting member are brought into contact. Therefore, the heat can be efficiently exhausted. As a result, an increase in the temperature of the image pickup element can be prevented during continuous imaging, etc., and the noise can be reduced.

In the present embodiment, although the heat is exhausted into the air from the heat exhausting member 35d, the heat exhausting member 35d and the camera body 11 may be brought into contact directly or through a heat-transfer member to exhaust the heat to the outside from the camera body 11. In that case, it is desirable to form the camera body 11 by a heat-transfer material with high heat conductivity, such as a metallic material and ceramic. Since the size of the camera body 11 is large, the thermal capacity is also large. Therefore, the heat generated by the image pickup element can be efficiently exhausted.

Figure 9:
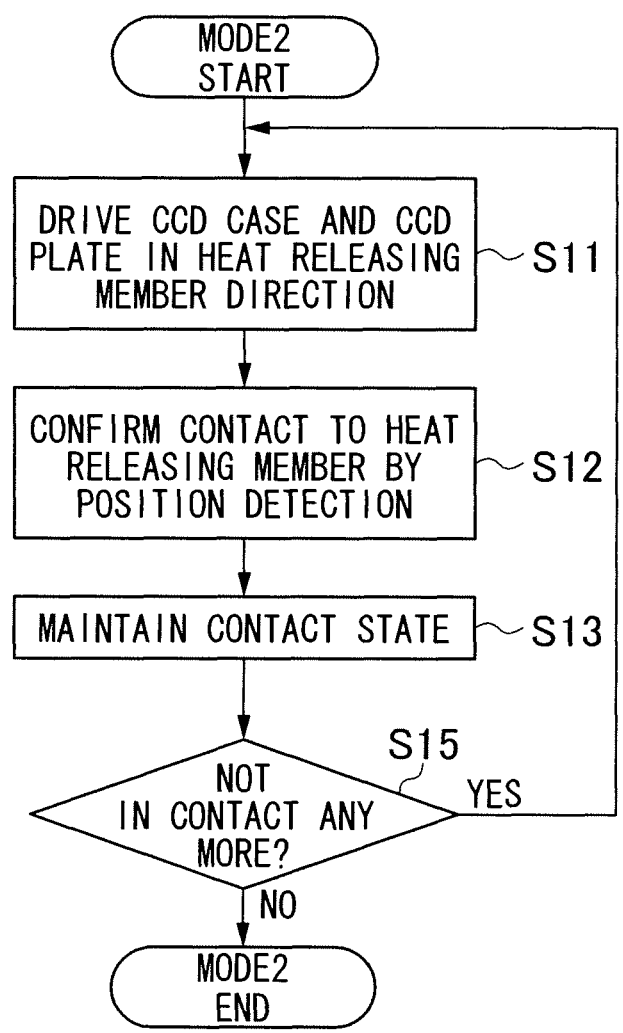
FIG. 9 is a flow chart illustrating a flow of a process of the mode 2 of a modified example relating to the first embodiment.

In the present embodiment, the position detection element 79 detects the position of the CCD plate 31 (step S12) in the mode 2 (step S2). The position detection element 79 detects that the convex portion 31a and the heat exhausting member 35d are in contact, and the CCD case 30 and the CCD plate 31 are terminated while the convex portion 31a and the heat exhausting member 35d are in contact (step S13). However, the convex portion 31a and the heat exhausting member 35d may be separated as an impact, etc. is applied to the digital camera 1. Therefore, as illustrated in FIG. 9, the CCD case 30 and the CCD plate 31 are terminated while the convex portion 31a and the heat exhausting member 35d are in contact (step S13), and then the position detection element 79 detects whether the convex portion 31a and the heat exhausting member 35d are not in contact any more (step S15). If the position detection element 79 detects that the convex portion 31a and the heat exhausting member 35d are not in contact any more (YES in step S15), the CCD case 30 and the CCD plate 31 may be moved in the +x direction to bring the convex portion 31a and the heat exhausting member 35d into contact (step S11).

In the present embodiment, although a CCD image sensor is used as the image pickup element 55, a CMOS (complementary metal-oxide semiconductor) image sensor may be used. In the case of the CMOS sensor, the position that generates the most heat varies depending on the position of the installed chip. Therefore, it is desirable to set a location that tends to generate the most heat in the CMOS sensor to the location closest to the heat exhausting member (+x side in the present embodiment).

In the present embodiment, although the voice coil motor is used as the actuator of the image blur correction apparatus, the actuator is not limited to the voice coil motor. For example, an expandable actuator, etc. using a stepping motor, a piezoelectric element, etc. may be used.

Second Embodiment

In the first embodiment of the presently disclosed subject matter, the image blur correction apparatus 24 is driven in the mode 2 to bring the convex portion 31a of the CCD plate 31 and the heat exhausting member 35d into contact to exhaust the heat. However, an electric current needs to be continuously applied to the coil 35b of the voice coil motor 35 to maintain the convex portion 31a and the heat exhausting member 35d that are in contact. The coil 35b consumes power, and the coil 35b generates heat. This results in the generation of heat to exhaust heat.

A second embodiment is an embodiment in which an elastic member is used to bring the convex portion 31a of the CCD plate 31 and the heat exhausting member 35d into contact. Hereinafter, a digital camera 2 according to the second embodiment will be described. The same parts as in the first embodiment are designated with the same reference numerals, and the description will not be repeated.

The camera body 11 of the digital camera 2 is formed in a horizontally long rectangular box shape. An optical system 12A, the stroboscope 14, etc. are arranged on the front side. The shutter button 15, the power button 16, the mode dial 17, etc. are arranged on the upper side of the camera body 11. Meanwhile, the monitor 18, the zoom button 19, the arrow buttons 20, the MENU/OK button 21, the DISP/BACK button 22, the playback button 23, etc. are arranged on the back side of the camera body 11.

Details of the optical system 12A will be described. The optical system 12A includes an aperture, a focus lens, a zoom lens (which are not illustrated), and an image blur correction apparatus 25.

The image blur correction apparatus 25 detects shaking of the digital camera 1 by the gyro sensors 71 and 74 (see FIG. 5) and moves the image pickup element 55 (see FIG. 5) in the direction opposite the shaking of the digital camera 1 to correct the image blur of the subject image formed in the image pickup element 55.

Figure 10A:
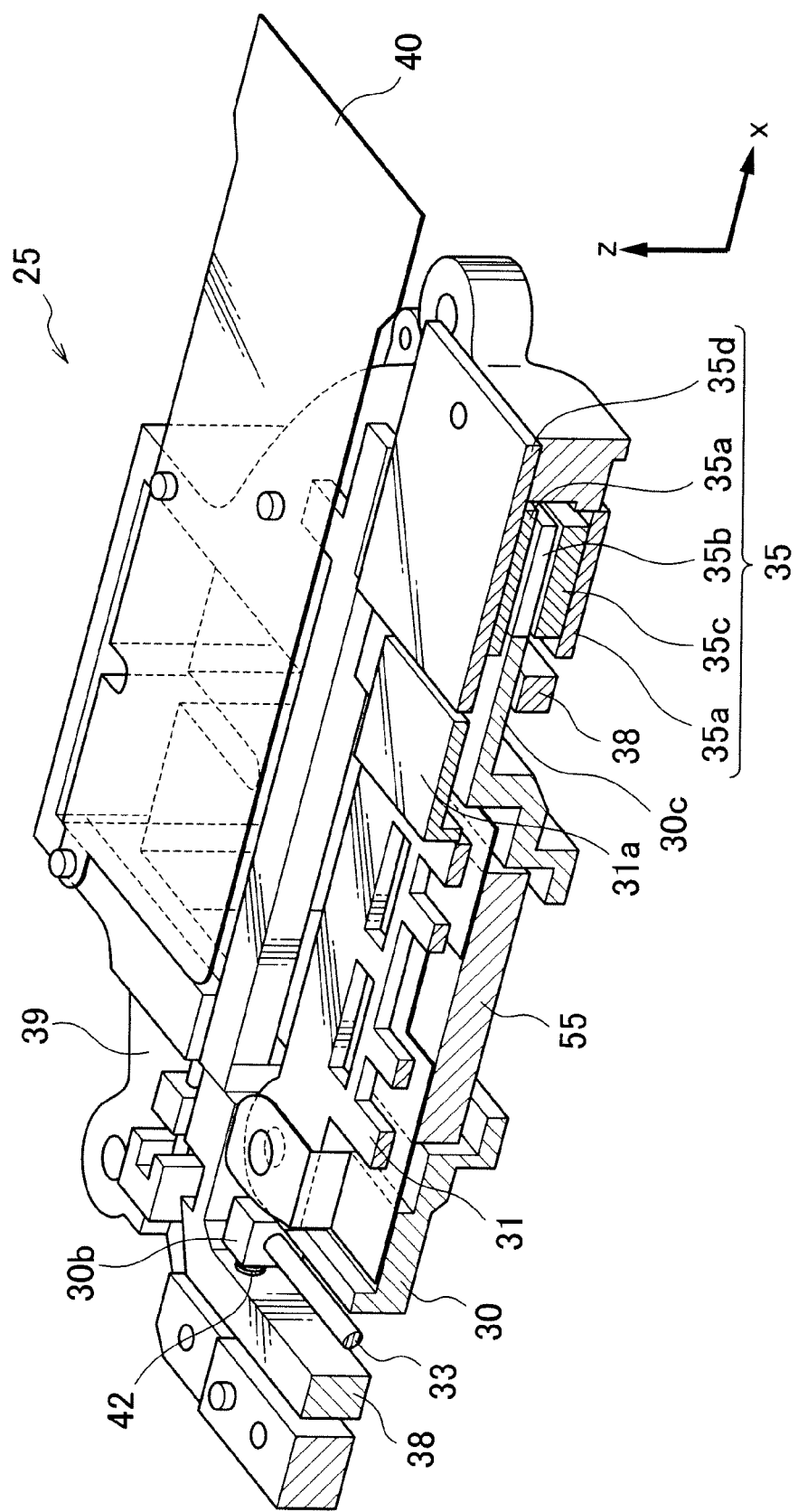
FIG. 10A is a schematic diagram of an image blur correction apparatus of a digital camera of a second embodiment of the presently disclosed subject matter, illustrating a state during imaging.

FIGS. 10A and 10B are transverse sectional views of the image blur correction apparatus 25. The image blur correction apparatus 25 includes the CCD case 30, the CCD plate 31, the voice coil motor 32, the main guide axis 33, the rotation stopping guide axis 34, the voice coil motor 35, the main guide axis 36, the rotation stopping guide axis 37, the slider 38, the frame 39, the main flexible substrate 40, the flexible substrate 41 for voice coil motor, and a spring 42.

As illustrated in FIGS. 10A and 10B, the spring 42 is arranged between the CCD plate 31 and the frame 39. The spring 42 applies energization force to the CCD plate 31 in the +x direction. Therefore, if the electric current is not applied to the coil 35b of the voice coil motor 35, the convex portion 31a and the heat exhausting member 35d are in contact as illustrated in FIG. 9B. To execute the shake prevention process, an electric current is applied to the coil 35b of the voice coil motor 35, and the convex portion 31a and the heat exhausting member 35d are separated as illustrated in FIG. 9A. In that case, the spring 42 is used to prevent the backlash of mechanics between the main guide axis 33 and the bearing 30b.

Figure 11:
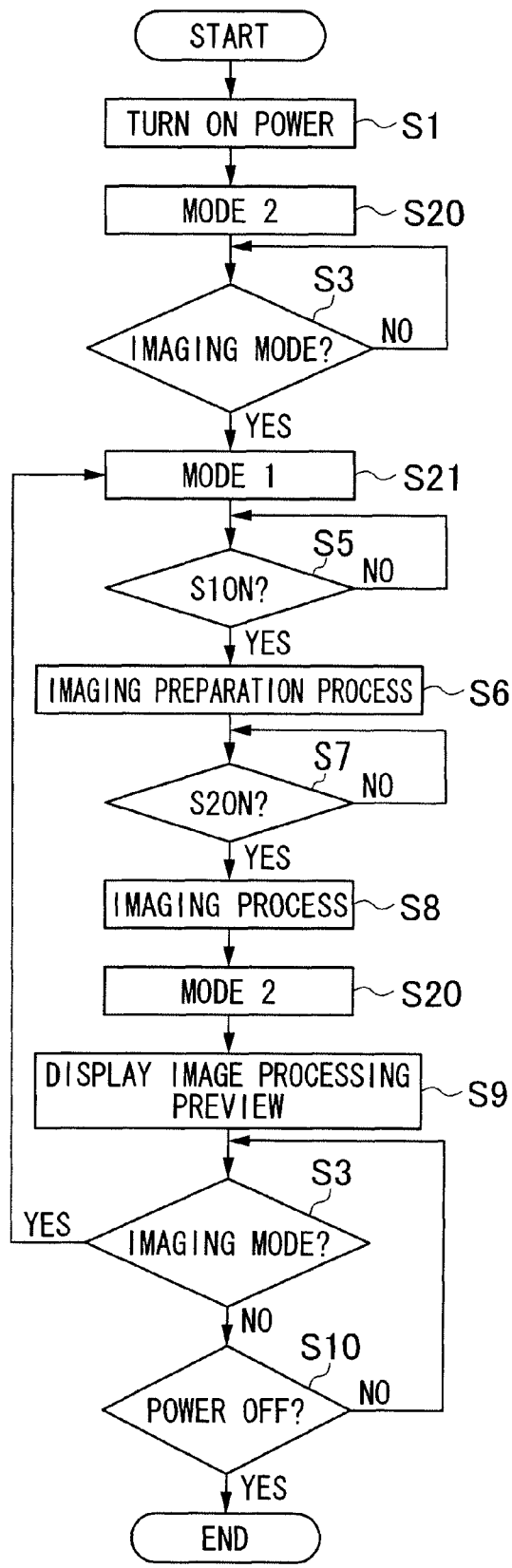
FIG. 11 is a flow chart illustrating a flow of a process of the digital camera of the second embodiment.

Actions of the digital camera 2 configured this way will be described. FIG. 11 is a flow chart illustrating a flow of a process of the digital camera 2. The CPU 50 mainly executes the following process.

Figure 12A:
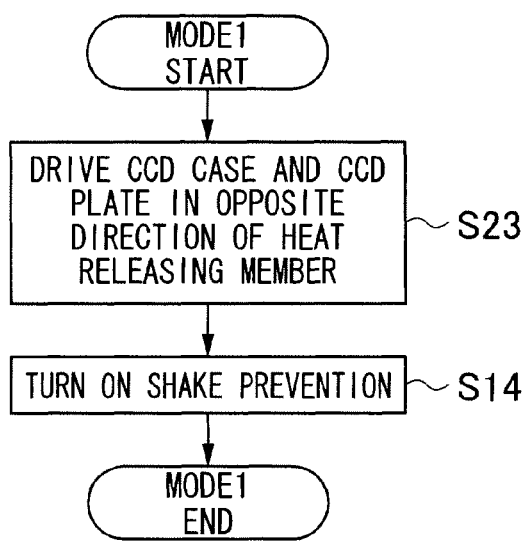
FIG. 12A is a flow chart illustrating a flow of a process of the mode 1 of the digital camera of the second embodiment.
Figure 12B:
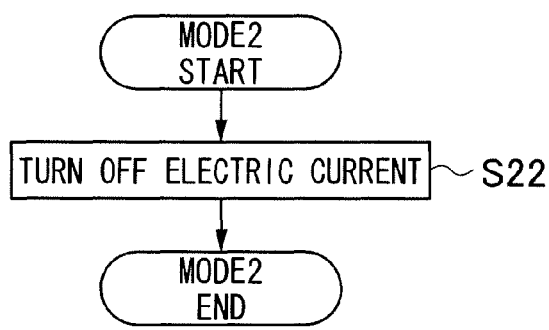
FIG. 12B is a flow chart illustrating a flow of a process of the mode 2 of the digital camera of the second embodiment.

When the power button is pressed to turn on the power of the digital camera 2 (step S1), the CPU 50 drives the image blur correction apparatus 25 in the mode 2 (step S20). As illustrated in FIG. 12B, in step S20, when the CPU 50 stops applying the electric current to the coil 35b, the energization force of the spring 42 moves the CCD case 30 and the CCD plate 31 in the +x direction, and the convex portion 31a and the heat exhausting member 35d are brought into contact (step S22).

The CPU 50 detects whether the operation mode of the digital camera 2 is the imaging mode (step S3). If the digital camera 2 is not in the imaging mode (NO in step S3), step S3 is executed again.

If the digital camera 2 is in the imaging mode (YES in step S3), the image blur correction apparatus 25 is driven in the mode 1 to perform image blur correction concurrently with photographing of the through image (step S21).

The process of step S21 will be described. The CPU 50 first applies an electric current to the coil 35b to move the CCD case 30 and the CCD plate 31 in the −x direction against the energization force of the spring 42 and brings the center of the image pickup element 55 into line with the optical axis (step S23). In this state, the image pickup element 55 consecutively picks up images and consecutively processes the image signals to generate image data for through image. The generated image data is sequentially inputted to the video encoder 63, converted to a signal format for display, and outputted to the monitor 18. This starts photographing for through image by the image pickup element 55.

After the start of live view image (through image) photographing, the CPU 50 executes a shake prevention process of correcting an image blur of a subject image picked up by the image pickup element 55 caused by vibration (such as camera shake) applied to the digital camera 2 (step S15).

The CPU 50 determines whether the shutter button 15 is half-pressed, in other words, whether an S1 ON signal is inputted to the CPU 50 (step S5). If the S1 ON signal is not inputted (NO in step S5), step S5 is executed again. If the S1 ON signal is inputted (YES in step S5), imaging preparation processes, in other words, AE, AF, and AWB processes, are executed in response to the S1 ON signal (step S6).

The CPU 50 determines whether the shutter button 15 is full-pressed, in other words, whether an S2 ON signal is inputted to the CPU 50 (step S7). If the S2 ON signal is not inputted (NO in step S7), step S5 is executed again. If the S2 ON signal is inputted (YES in step S7), the imaging process and recording process (step S8) are executed in response to the S2 ON signal.

When the imaging process and the storage process (step S8) are executed, the CPU 50 drives the image blur correction apparatus 25 in the mode 2 (step S20). As a result, the convex portion 31a of the CCD plate 31 touches the heat exhausting member 35d, and the heat generated by the image pickup element 55 in the imaging preparation process (step S7) and the imaging process (step S8) is exhausted from the heat exhausting member 35d.

The CPU 50 inputs the compressed image data generated in step S8 to the compression/decompression processing device 60, converts the compressed image data to uncompressed image data, inputs the image data to the SDRAM 52, and performs preview display by outputting the image data from the SDRAM 52 to the monitor 18 through the video encoder 63 (step S9). The image blur correction apparatus 25 is driven in the mode 2 during the preview display (step S9), and the heat generated by the image pickup element 55 is continuously exhausted.

The CPU 50 detects whether the operation mode of the digital camera 2 is the imaging mode (step S3). If the digital camera 2 is in the imaging mode (YES in S3), the image blur correction apparatus 25 is driven in the mode 1 to perform image blur correction concurrently with photographing of the through image (step S21).

If the digital camera 2 is not in the imaging mode (NO in step S3), whether the power is off is determined (step S10). If the power is not off (NO in step S10), step S3 is executed again. If the power is off (YES in step S3), the process ends.

According to the present embodiment, if the image blur correction apparatus 25 is not driven in the mode 1, the convex portion 31a and the heat exhausting member 35d are always in contact, including when the power is off. Therefore, the power is not consumed to maintain the convex portion 31a and the heat exhausting member 35d that are in contact. Therefore, the heat generated by the image pickup element can be more efficiently exhausted. Furthermore, since the voice coil motor does not have to be driven to exhaust the heat, excessive heat is not generated.

According to the present embodiment, the CCD plate 31 does not vibrate when the power is off because the energization force works on the CCD plate 31. Therefore, a problem, such as the breakage of the CCD plate 31 or the heat exhausting member 35d due to carrying or vibration of the digital camera and the generation of garbage, can be prevented.

In the present embodiment, the convex portion 31a and the heat exhausting member 35d are brought into contact by the energization force of the spring 42 without applying an electric current to the coil 35b in the mode 2. However, the contact may not be surely made due to, for example, dispersion in the energization force of the spring. Therefore, the position detection element 79 may be used to detect the positions of the CCD case 30 and the CCD plate 31, an electric current may be applied to the coil 35b if the convex portion 31a and the heat exhausting member 35d are not in contact to thereby bring the convex portion 31a and the heat exhausting member 35d into contact.

Third Embodiment

In the first embodiment of the presently disclosed subject matter, the image blur correction apparatus 24 is driven in the mode 2 to bring the convex portion 31a of the CCD plate 31 and the heat exhausting member 35d into contact to exhaust the heat. However, since the convex portion 31a and the heat exhausting member 35d are both metallic members, the contact may be made in just a tiny area due to the unevenness of surface, the tilt of members, etc.

A third embodiment is an embodiment in which the convex portion 31a and the heat exhausting member 35d are brought into contact through a heat-transfer elastic member. Hereinafter, a digital camera 3 according to the third embodiment will be described. The same parts as in the first embodiment are designated with the same reference numerals, and the description will not be repeated.

The camera body 11 of the digital camera 3 is formed in a horizontally long rectangular box shape. An optical system 12B, the stroboscope 14, etc. are arranged on the front side. The shutter button 15, the power button 16, the mode dial 17, etc. are arranged on the upper side of the camera body 11.

Meanwhile, the monitor 18, the zoom button 19, the arrow buttons 20, the MENU/OK button 21, the DISP/BACK button 22, the playback button 23, etc. are arranged on the back side of the camera body 11.

Details of the optical system 12B will be described. The optical system 12B mainly includes an aperture, a focus lens, a zoom lens (which are not illustrated), and an image blur correction apparatus 26.

An image blur correction apparatus 26 detects shaking of the digital camera 3 by the gyro sensors 71 and 74 (see FIG. 5) and moves the image pickup element 55 (see FIG. 5) in the direction opposite the shaking of the digital camera 3 to correct the image blur of the subject image formed in the image pickup element 55.

Figure 13A:
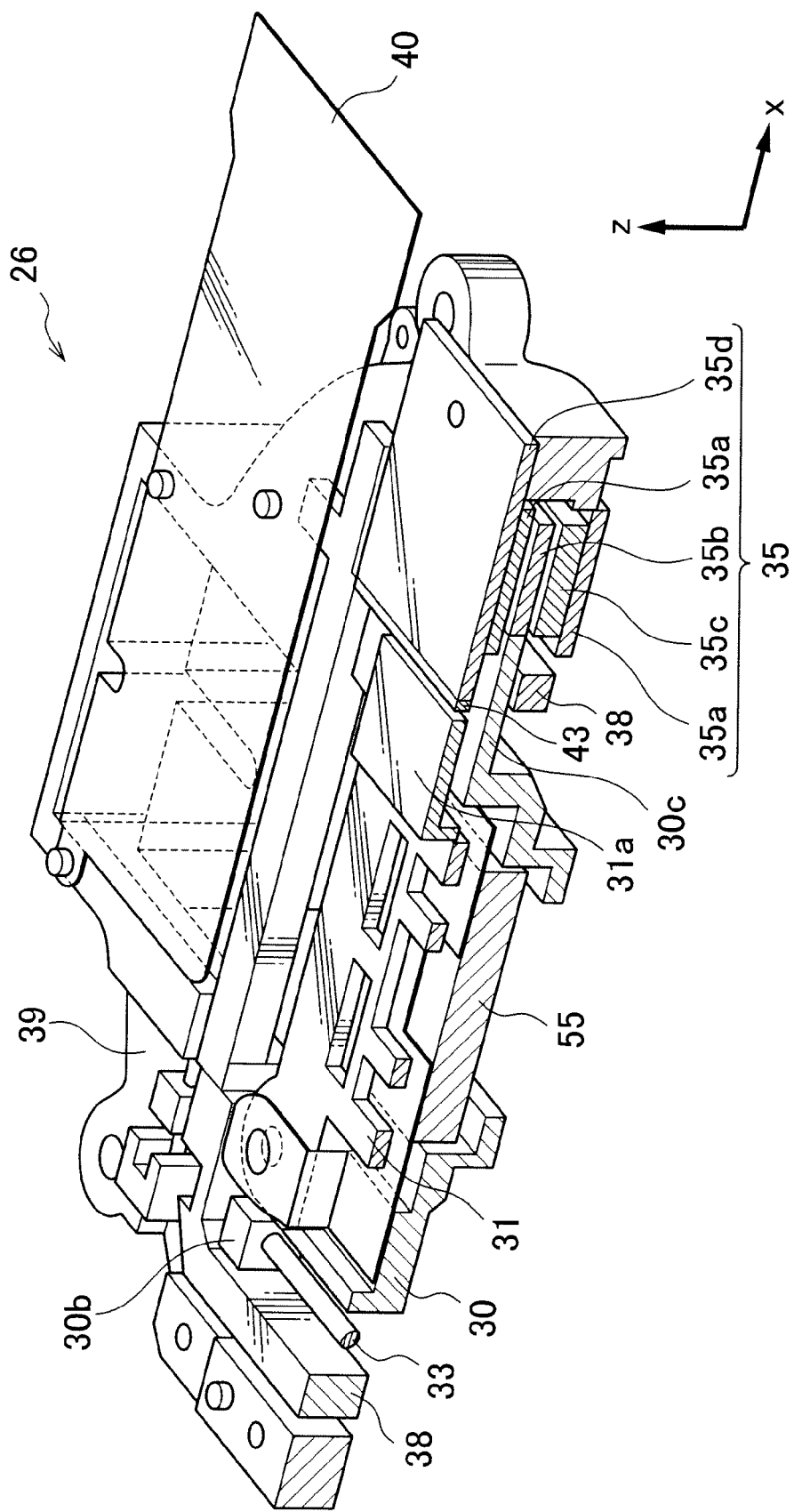
FIG. 13A is a schematic diagram of an image blur correction apparatus of a digital camera of a third embodiment of the presently disclosed subject matter, illustrating a state during imaging.
Figure 13B:
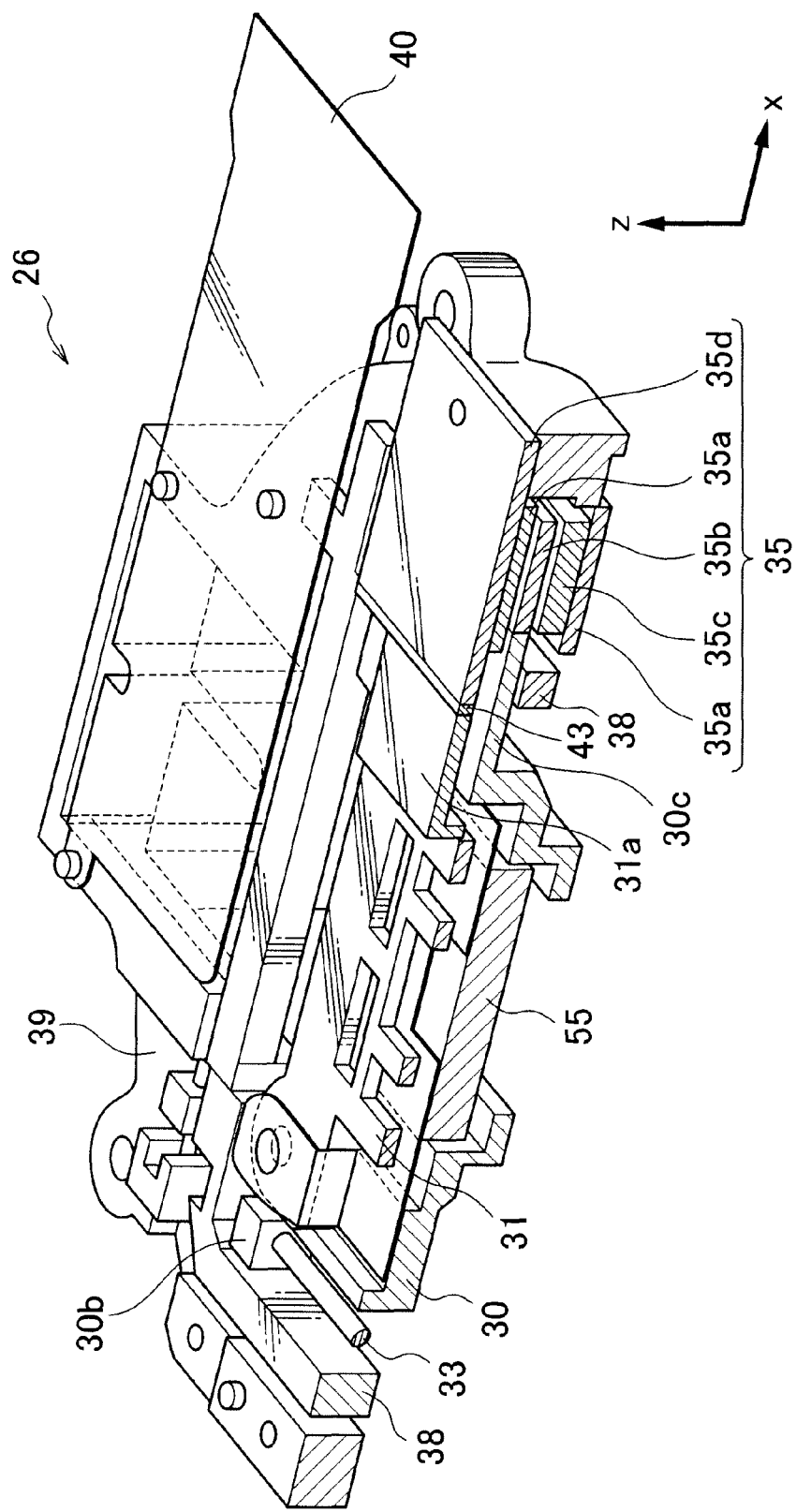
FIG. 13B is a schematic diagram of the image blur correction apparatus of the digital camera of the third embodiment of the presently disclosed subject matter, illustrating a state during exhausting heat

FIGS. 13A and 13B are transverse sectional views of the image blur correction apparatus 26. The image blur correction apparatus 26 includes the CCD case 30, the CCD plate 31, the voice coil motor 32, the main guide axis 33, the rotation stopping guide axis 34, the voice coil motor 35, the main guide axis 36, the rotation stopping guide axis 37, the slider 38, the frame 39, the main flexible substrate 40, the flexible substrate 41 for voice coil motor, and a gel member 43 for exhausting heat.

The gel member 43 for exhausting heat is an elastic heat-transfer gel (jellied) member, such as silicon, and as illustrated in FIGS. 13A and 13B, is arranged at the edge near the CCD plate 31 of the heat exhausting member 35d. It is desirable to use a material with more than 1 W/m·k heat conductivity for the gel member 43 for exhausting heat.

Figure 14:
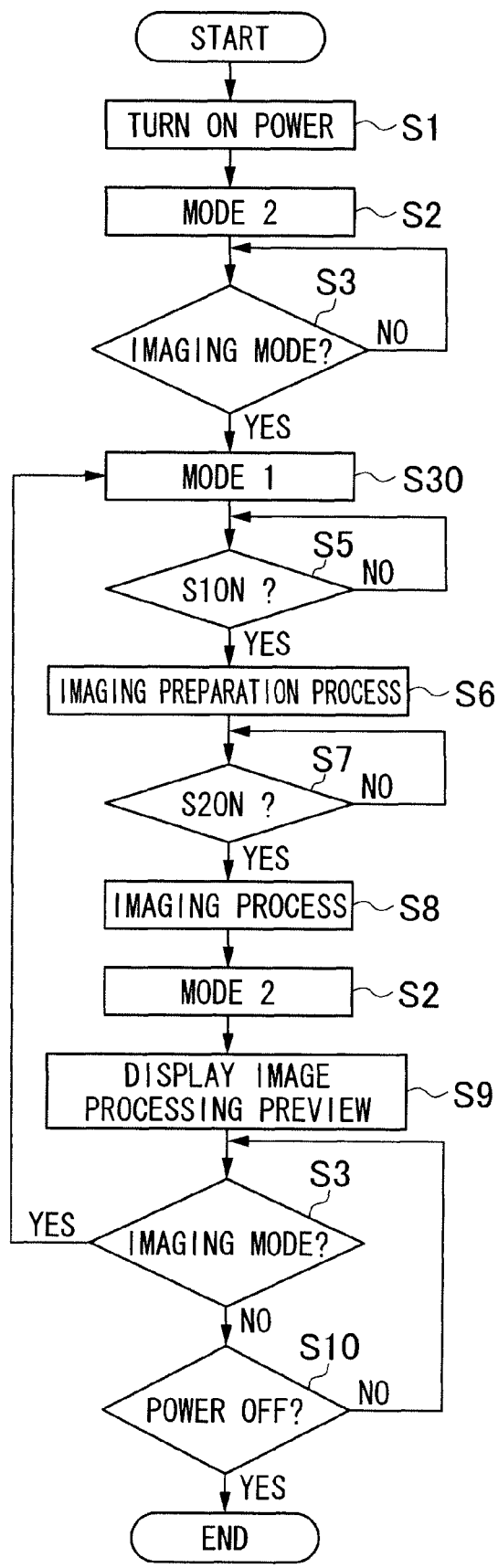
FIG. 14 is a flow chart illustrating a flow of a process of the digital camera of the third embodiment.

Actions of the digital camera 3 configured this way will be described. FIG. 14 is a flow chart illustrating a flow of a process of the digital camera 3. The CPU 50 mainly executes the following process.

When the power button is pressed to turn on the power of the digital camera 3 (step S1), the CPU 50 drives the image blur correction apparatus 26 in the mode 2 (step S2). As a result, as illustrated in FIG. 13B, the convex portion 31a and the heat exhausting member 35d are brought into contact through the gel member 43 for exhausting heat, and the contract area increases. Therefore, the heat can be more efficiently exhausted.

The CPU 50 detects whether the operation mode of the digital camera 3 is the imaging mode (step S3). If the digital camera 3 is not in the imaging mode (NO in step S3), step S3 is executed again.

If the digital camera 3 is in the imaging mode (YES in step S3), the image blur correction apparatus 26 is driven in the mode 1 to perform image blur correction concurrently with photographing of the through image (step S30).

Figure 15:
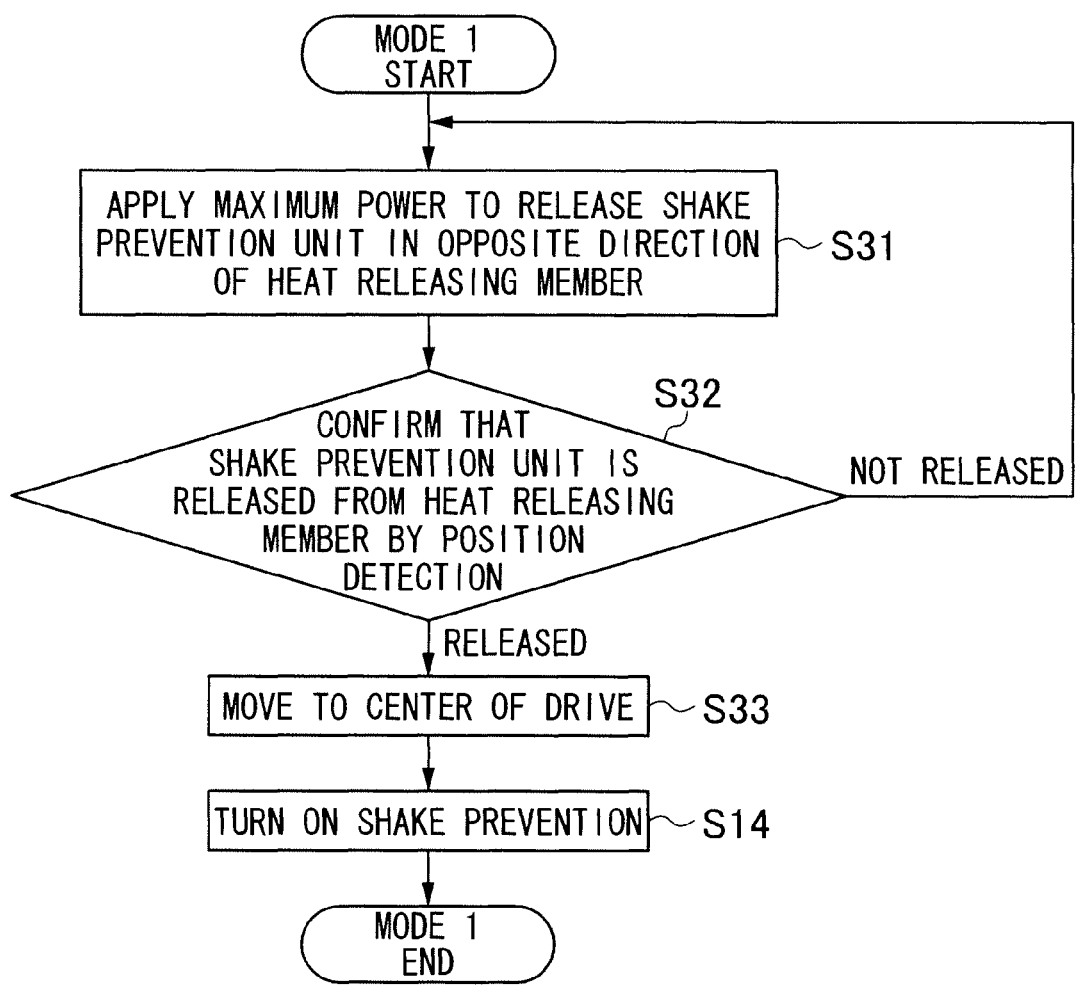
FIG. 15 is a flow chart illustrating a flow of a process of the mode 1 of the digital camera of the third embodiment.

The process of step S30 will be described with reference to FIG. 15. In the present embodiment, the convex portion 31a and the heat exhausting member 35d are in contact through the gel member 43 for exhausting heat. Therefore, the convex portion 31a and the gel member 43 for exhausting heat may be adhered due to the adhesion of the gel member 43 for exhausting heat. As a result, the convex portion 31a and the gel member 43 for exhausting heat may not be detached during the shake prevention drive of the image blur correction apparatus 26, and the shake prevention drive may be impossible. A drop in surrounding light amount, shading, etc. may occur because images are taken at the edge of the image pickup element 55. Therefore, driving force that is greater than normal driving force needs to be provided to the voice coil motor 35 for releasing the contact in order to surely separate the convex portion 31a and the gel member 43 for exhausting heat even if the convex portion 31a and the gel member 43 for exhausting heat are adhered. Consequently, the CPU 50 applies, to the coil 35b, the maximum electric current that can be applied to the coil 35b and moves the CCD case 30 and the CCD plate 31 in the −x direction (step S31).

The CPU 50 then uses the position detection element 79 to detect the position in the x direction and confirms that the convex portion 31a and the gel member 43 for exhausting heat are separated (step S32). If the separation of the convex portion 31a and the gel member 43 for exhausting heat cannot be confirmed (NO in step S32), step S31 is executed again.

If the separation of the convex portion 31a and the gel member 43 for exhausting heat can be confirmed (NO in step S32), the CPU 50 applies an electric current to the coil 35b and brings the center of the image pickup element 55 into line with the optical axis (step S33). In this state, the image pickup element 55 consecutively picks up images and consecutively processes the image signals to generate image data for a live view image (through image). The generated image data is sequentially inputted to the video encoder 63, converted to a signal format for display, and outputted to the monitor 18. This starts photographing for through image by the image pickup element 55.

After the start of through image photographing, the CPU 50 executes a shake prevention process of correcting an image blur of a subject image picked up by the image pickup element 55 caused by vibration (such as camera shake) applied to the digital camera 3 (step S15).

The CPU 50 determines whether the shutter button 15 is half-pressed, in other words, whether an S1 ON signal is inputted to the CPU 50 (step S5). If the S1 ON signal is not inputted (NO in step S5), step S5 is executed again. If the S1 ON signal is inputted (YES in step S5), imaging preparation processes, in other words, AE, AF, and AWB processes, are executed in response to the S1 ON signal (step S6).

The CPU 50 determines whether the shutter button 15 is full-pressed, in other words, whether an S2 ON signal is inputted to the CPU 50 (step S7). If the S2 ON signal is not inputted (NO in step S7), step S5 is executed again. If the S2 ON signal is inputted (YES in step S7), the imaging process and recording process (step S8) are executed in response to the S2 ON signal.

When the imaging process and the storage process (step S8) are executed, the CPU 50 drives the image blur correction apparatus 25 in the mode 2 (step S2). As a result, the convex portion 31a of the CCD plate 31 touches the heat exhausting member 35d, and the heat generated by the image pickup element 55 in the imaging preparation process (step S7) and the imaging process (step S8) is exhausted from the heat exhausting member 35d.

The CPU 50 inputs the compressed image data generated in step S8 to the compression/decompression processing device 60, converts the compressed image data to uncompressed image data, inputs the image data to the SDRAM 52, and performs preview display by outputting the image data from the SDRAM 52 to the monitor 18 through the video encoder 63 (step S9). The image blur correction apparatus 25 is driven in the mode 2 during the preview display (step S9), and the heat is continuously exhausted.

The CPU 50 detects whether the operation mode of the digital camera 3 is the imaging mode (step S3). If the digital camera 3 is in the imaging mode (YES in S3), the image blur correction apparatus 25 is driven in the mode 1 to perform image blur correction concurrently with photographing of the through image (step S30).

If the digital camera 3 is not in the imaging mode (NO in step S3), whether the power is off is determined (step S10). If the power is not off (NO in step S10), step S3 is executed again. If the power is off (YES in step S3), the process ends.

According to the present embodiment, the convex portion 31a and the heat exhausting member 35d are brought into contact through the gel member 43 for exhausting heat. Therefore, the contact area increases, and the heat can be more efficiently exhausted.

Although the gel member for exhausting heat is arranged on the heat exhausting member in the present embodiment, the gel member for exhausting heat may be arranged on the CCD plate, or the gel member for exhausting heat may be arranged on both the heat exhausting member and the CCD plate.

Figure 16A:
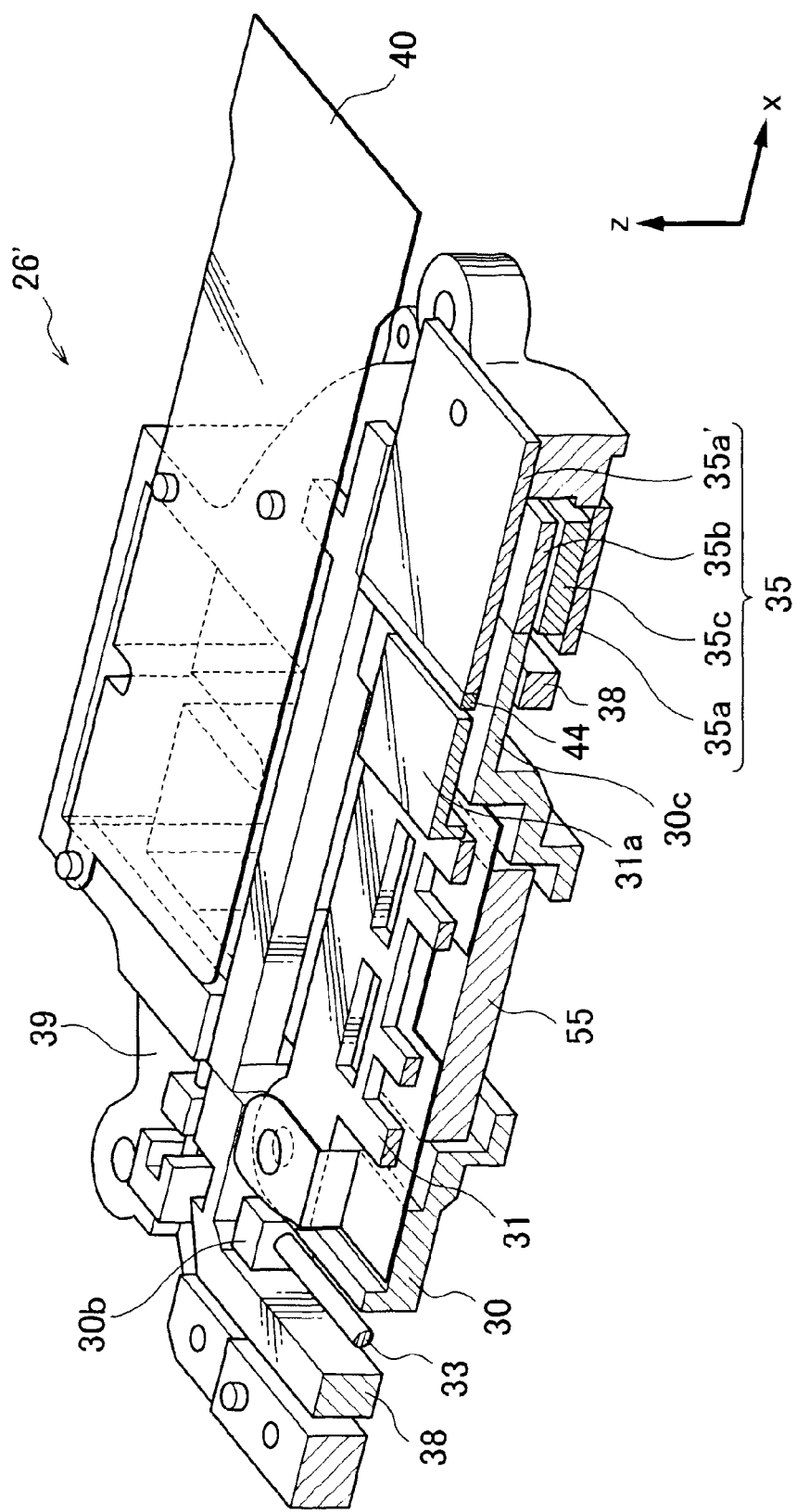
FIG. 16A is schematic diagram of an image blur correction apparatus of a modified example of the digital camera of the third embodiment, illustrating a state during imaging.
Figure 16B:
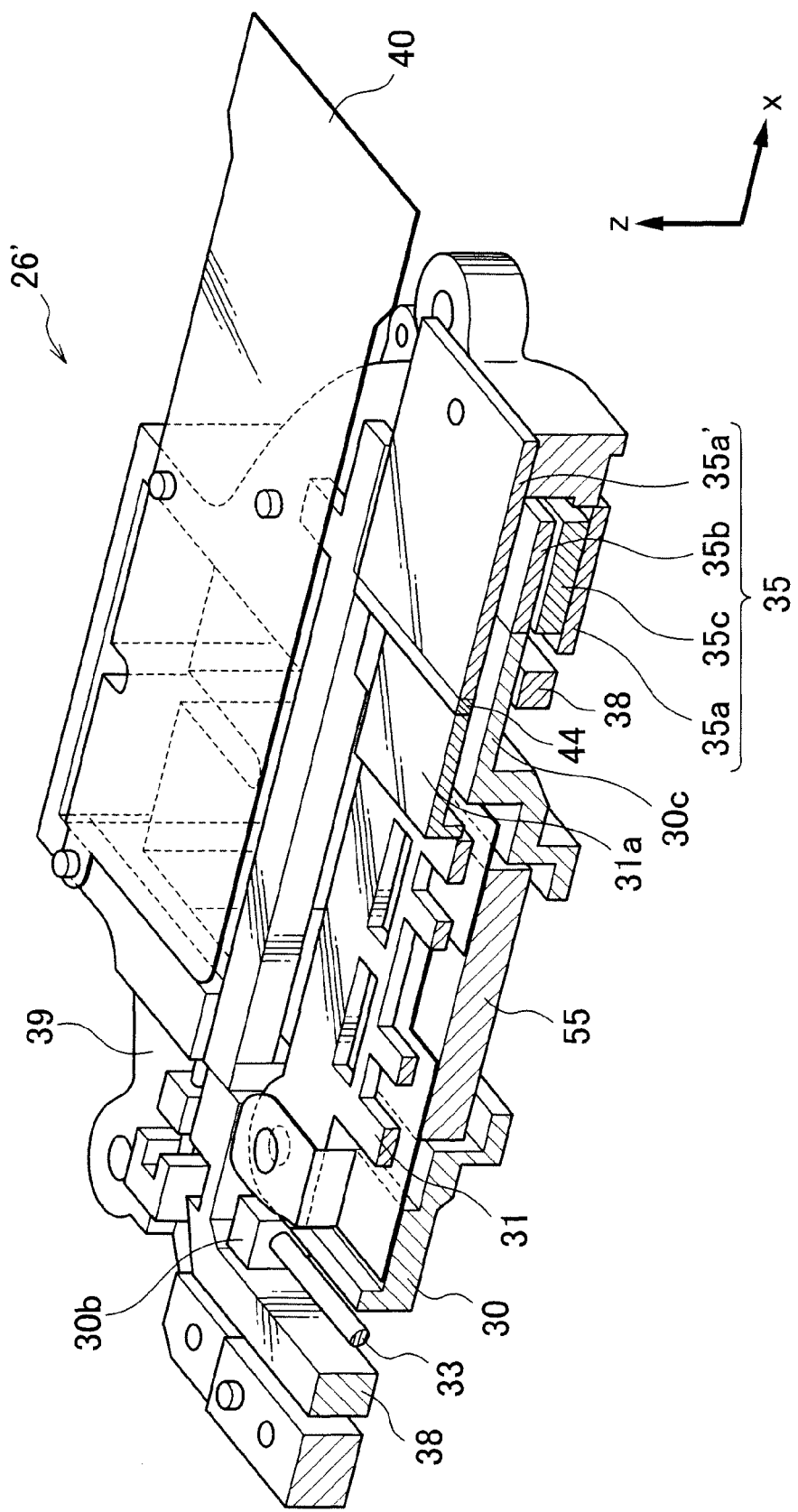
FIG. 16B is a schematic diagram of the image blur correction apparatus of a modified example of the digital camera of the third embodiment, illustrating a state during exhausting heat

Although the heat exhausting member 35d is provided separately from the yoke 35a in the present embodiment, a metallic component, such as a yoke and a magnet, may also serve as the heat exhausting member. FIGS. 16A and 16B illustrate a configuration in which the yoke 35a is also used as the heat exhausting member, and the gel member 44 for exhausting heat is arranged on the edge of the yoke 35a closer to the CCD plate 31.

In the case of the voice coil motor, the magnet and the yoke are metallic members which absorb a large amount of heat. There is no need to arrange a special member for exhausting heat when the metallic members also serve as the heat exhausting members. In other words, there is no difference from the structure of an image blur correction apparatus without heat exhausting countermeasures. Therefore, the heat can be efficiently exhausted without an increase in the size or the cost.

The magnet and yoke members are fixed to the frame 39, and the frame 39 is fixed to the camera body 11 (or lens barrel). Therefore, the heat generated from the image pickup element 55 can be exhausted to the camera body 11 through the frame 39. As a result, the heat generated from the image pickup element 55 can be exhausted to the outside, and the heat exhausting effect is large. In that case, it is desirable that the camera body 11 (or lens barrel) is made of a heat-transfer material such as metal.

Figure 17A:
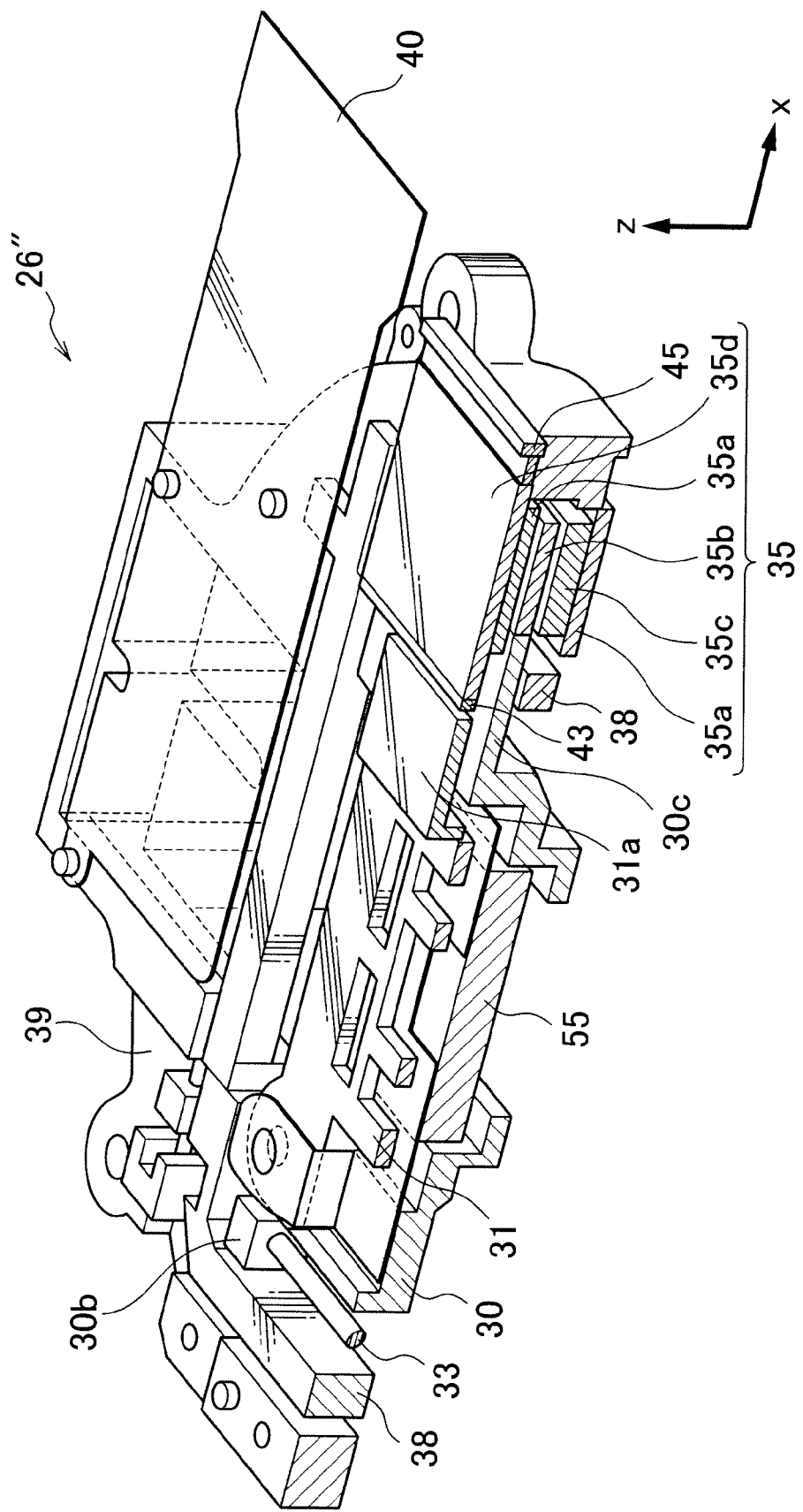
FIG. 17A is a schematic diagram of an image blur correction apparatus of another modified example of the digital camera of the third embodiment, illustrating a state during imaging.

In the present embodiment, the voice coil motor 35 is driven to bring the convex portion 31a and the heat exhausting member 35d into contact through the gel member 43 for exhausting the heat generated from the image pickup element 55. However, as illustrated in FIGS. 17A and 17B, an actuator, such as a piezoelectric element, a voice coil motor, and a stepping motor, may be further used to move the heat exhausting member 35d to bring the convex portion 31a and the heat exhausting member 35d into contact through the gel member 43 for exhausting heat. This can press the convex portion 31a and the heat exhausting member 35d against each other from both driving directions through the gel member 43 for exhausting heat. Therefore, the heat exhaust area can be increased, and the heat can be efficiently exhausted.

In the present embodiment, the contact is made through the gel member 43 for exhausting heat, and driving force greater than normal driving force is applied to the voice coil motor 35 to move the CCD case 30 and the CCD plate 31 in the −x direction. However, the same process may be executed in an embodiment in which the contact is made not through the gel member 43 for exhausting heat.

Fourth Embodiment

In the first embodiment of the presently disclosed subject matter, the heat generated by the image pickup element 55 is exhausted through the heat exhausting member 35d arranged on the voice coil motor 35. However, the member provided with the heat exhausting member 35d for exhausting the heat generated by the image pickup element 55 is not limited to the voice coil motor 35. In the second embodiment of the presently disclosed subject matter, an elastic member is used to bring the convex portion 31a of the CCD plate 31 and the heat exhausting member 35d into contact. However, in order to obtain a thrust for overcoming the power of spring, an electric current applied to the coil 35b needs to be increased.

In a fourth embodiment, the heat generated by the image pickup element 55 is exhausted through a heat exhausting member arranged on the voice coil motor 32. A digital camera 4 according to the fourth embodiment will be described. The same parts as in the first embodiment are designated with the same reference numerals, and the description will not be repeated.

The camera body 11 of the digital camera 4 is formed in a horizontally long rectangular box shape. An optical system 12C, the stroboscope 14, etc. are arranged on the front side. The shutter button 15, the power button 16, the mode dial 17, etc. are arranged on the upper side of the camera body 11. Meanwhile, the monitor 18, the zoom button 19, the arrow buttons 20, the MENU/OK button 21, the DISP/BACK button 22, the playback button 23, etc. are arranged on the back side of the camera body 11.

Details of the optical system 12C will be described. The optical system 12C includes an aperture, a focus lens, a zoom lens (which are not illustrated), and an image blur correction apparatus 27.

Figure 18:
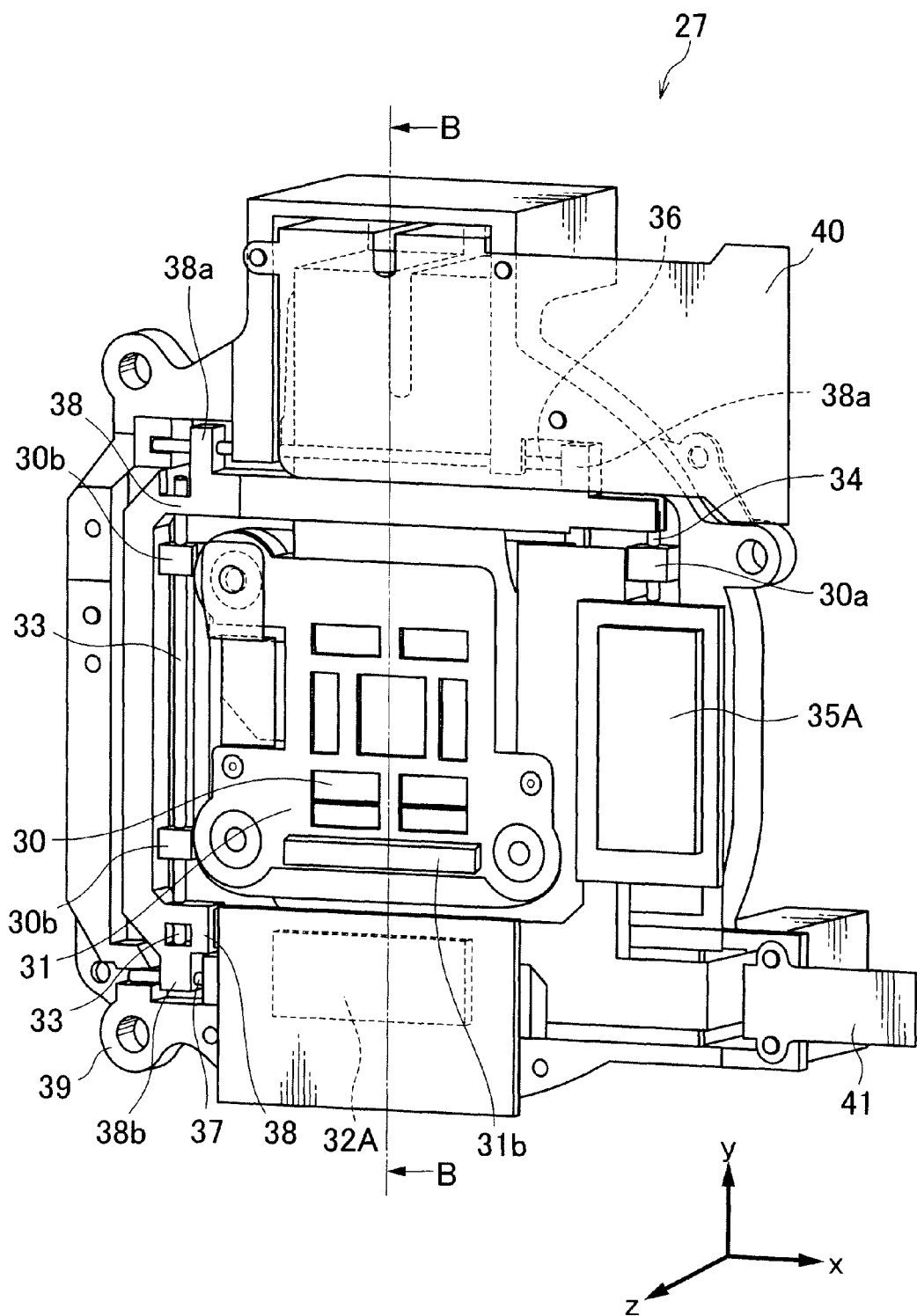
FIG. 18 is schematic diagram of an image blur correction apparatus of a digital camera of a fourth embodiment of the presently disclosed subject matter.

FIG. 18 is a front side perspective view of the image blur correction apparatus 27 when the digital camera 4 is held at a regular orientation (orientation of FIG. 1A). In the image blur correction apparatus 27, the gyro sensors 71 and 74 (see FIG. 5) detect shaking of the digital camera 4 and moves the image pickup element 55 (see FIG. 5) in the direction opposite the shaking of the digital camera 4 to correct the image blur of the subject image formed in the image pickup element 55.

A CCD plate 31A is a metallic plate-like member and is used for tilt adjustment, etc. The CCD plate 31A is screwed on the front side (+z side) of the CCD case 30 so as to cover the CCD case 30. A hole is formed at substantially the center of the CCD plate 31A, and the image pickup element 55 is exposed from the hole. A rib-like convex portion 31b is formed along the edge of the perpendicularly lower side (−y side) of the CCD plate 31A.

The voice coil motors 32A and 35A are driven according to a signal outputted from a motor driver 77 (see FIG. 5). The voice coil motor 32A is arranged on the perpendicularly lower side of the CCD case 30 and the CCD plate 31 and moves the CCD case 30 and the CCD plate 31 in the y direction. The voice coil motor 35A is arranged on the right side of the CCD case 30 and the CCD plate 31 and moves the CCD case 30, the CCD plate 31, and the slider 38 in the x direction. The structures of the voice coil motors 32A and 35A are the same except that a heat exhausting member 32d (described in detail later) is not arranged on the voice coil motor 32A. Therefore, the voice coil motor 32A will be described.

Figure 19:
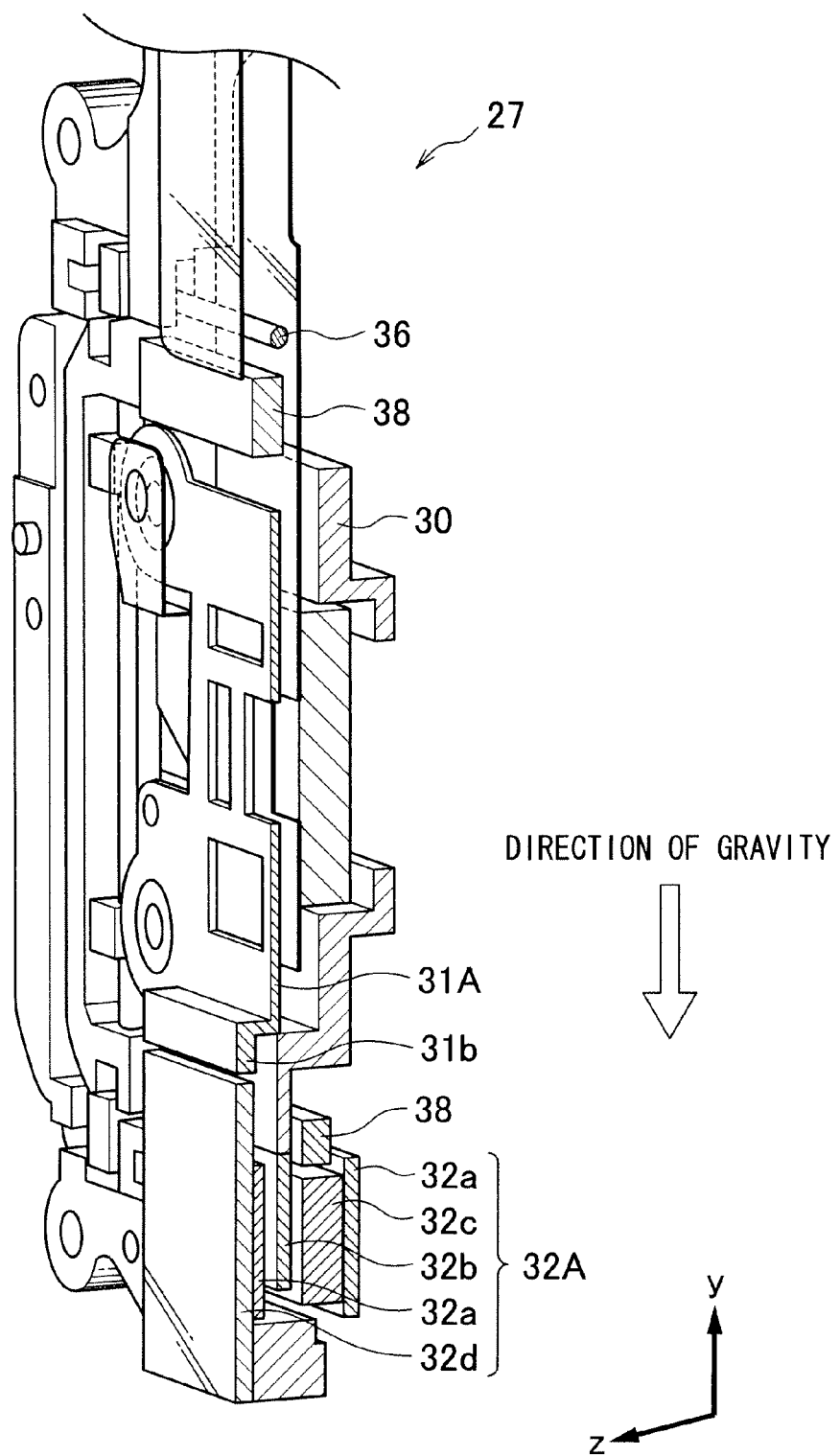
FIG. 19 is a B-B cross-sectional view of the image blur correction apparatus during imaging.

FIG. 19 is a B-B cross section of FIG. 18. The voice coil motor 32A includes yokes 32a, a coil 32b, a magnet 32c, and a heat exhausting member 32d.

The yokes 32a are metallic plates fixed to the frame 39. The yokes 32a reduce the flux leakage by the magnet 32c and strengthen the magnetic field between the yokes 32a. One of the yokes 32a is arranged adjacent to the magnet 32c, and the other yoke 32a is arranged at a position sandwiching the coil 3b and the magnet 32c by the yokes 32a. The metallic heat exhausting member 32d is integrally formed on the front side of the other yoke 32a.

The magnet 32c is a magnet, both sides of which are multipolar, and is arranged adjacent to the front side of the yokes 32a. In the magnet 32c, an upward (+z direction) magnetic field is generated on the lower side (−y side) of FIG. 19, and a downward (−z direction) magnetic field is generated on the upper side (+y side). The directions of the magnetic fields of FIG. 19 are examples and are not limited to these.

The coil 32b is a cylindrical air core coil that is fixed at the edge of the CCD plate 31 and that has a substantially rectangular cross section. The helix direction of the coil 32b is counterclockwise as seen from the +z direction, and the coil 32b is formed to overlap in the optical axis direction (z direction). The helix direction of the coil 32b is an example and is not limited to this. The coil 32b is fixed to a convex portion formed on the right side of the CCD case 30 and is arranged in the magnetic field by the magnet 32c. Therefore, when an electric current is applied to the coil 32b, force in the vertical direction of both the magnetic field and the electric current is generated due to the Fleming's left-hand rule. Since the magnet 32c is fixed to the frame 39, the magnet 32c moves in the vertical direction of both the magnetic field and the electric current, i.e. in the y direction, by the force. Accordingly, the CCD case 30 and the CCD plate 31, i.e. the image pickup element 55, also move in the y direction.

Figure 20:
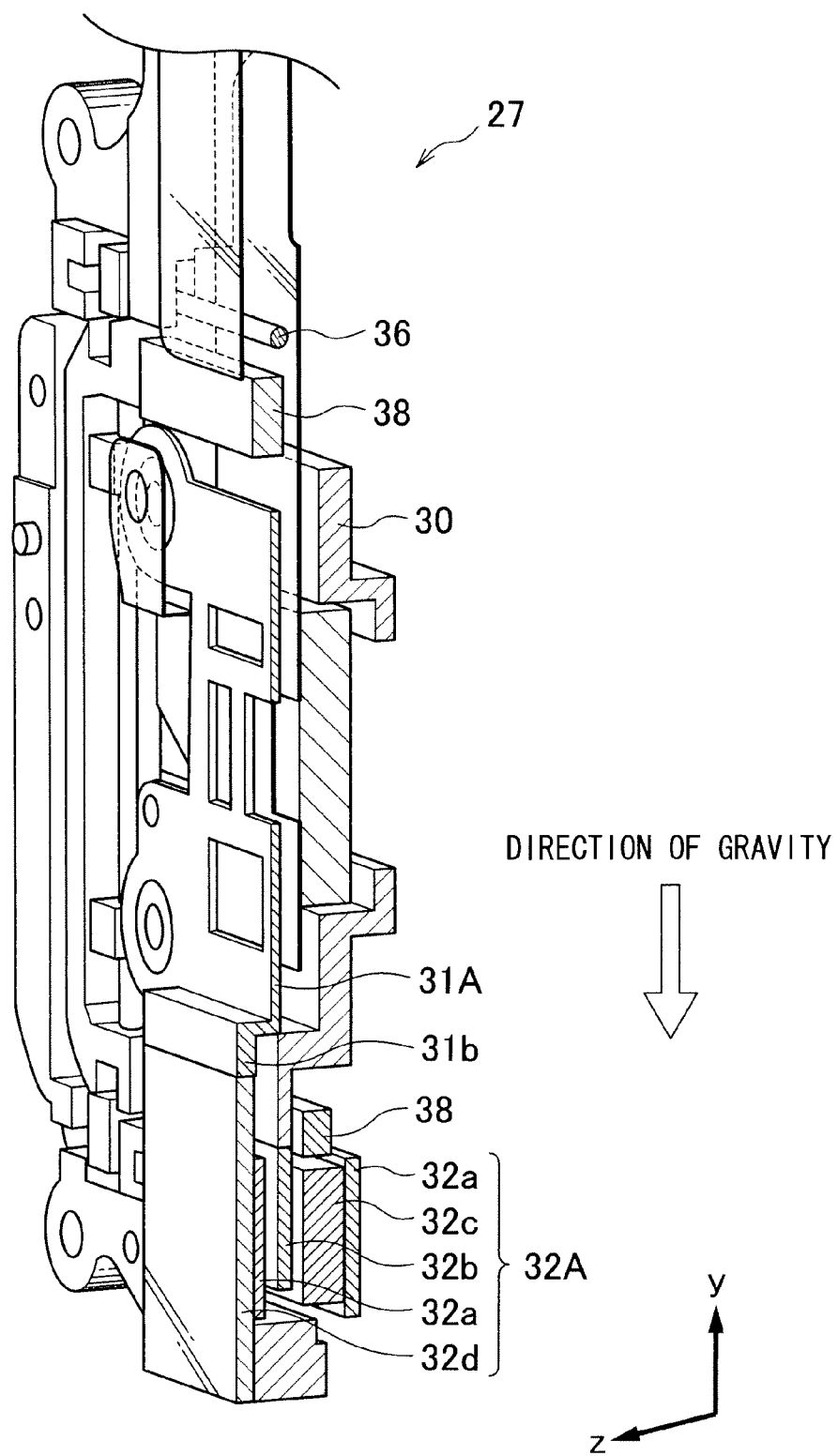
FIG. 20 is a B-B cross-sectional view of the image blur correction apparatus during exhausting heat

FIG. 20 illustrates a state after the CCD case 30 and the CCD plate 31 have moved in the −y direction to the maximum from the state in which the image pickup element 55 illustrated in FIG. 19 is on the optical axis. By gravity, the CCD case 30 and the CCD plate 31 can move in the −y direction to the position where the convex portion 31a and the heat exhausting member 32d are in contact. The heat generated by the image pickup element 55 is transferred to the CCD plate 31 through the CCD case 30. As the convex portion 31a and the heat exhausting member 32d are in contact, the heat transferred to the CCD plate 31 is transferred to the heat exhausting member 32d (see an arrow in FIG. 20) and exhausted into the air from the heat exhausting member 32d.

Figure 21:
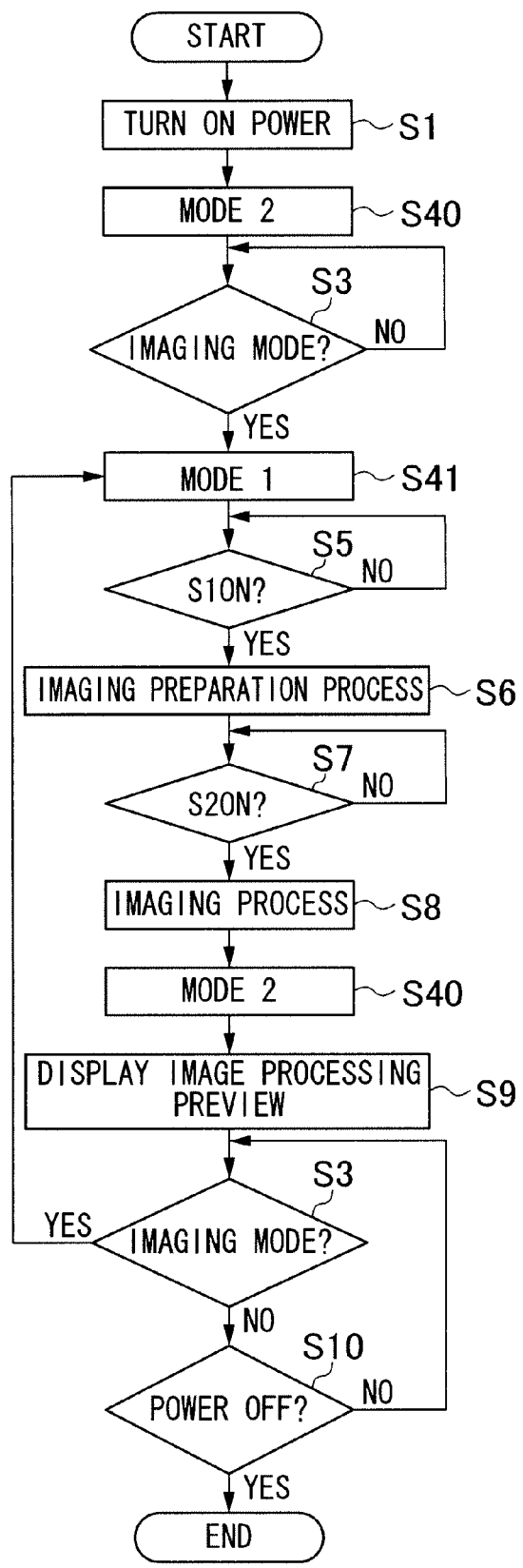
FIG. 21 is a flow chart illustrating a flow of a process of the digital camera of the fourth embodiment.

Actions of the digital camera 4 configured this way will be described. FIG. 21 is a flow chart illustrating a flow of a process of the digital camera 4. The CPU 50 mainly executes the following process.

Figure 22A:
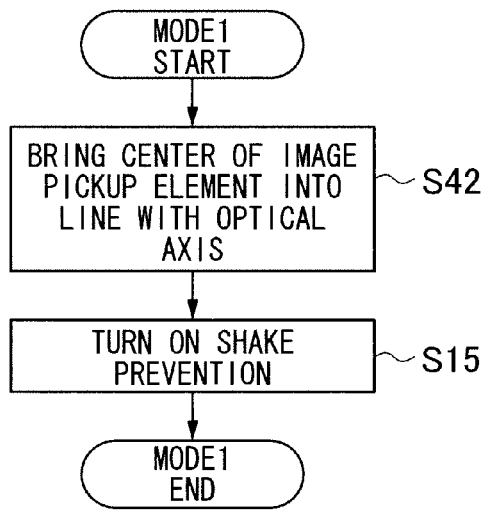
FIG. 22A is a flow chart illustrating a flow of a process of the mode 1 of the digital camera of the fourth embodiment.
Figure 22B:
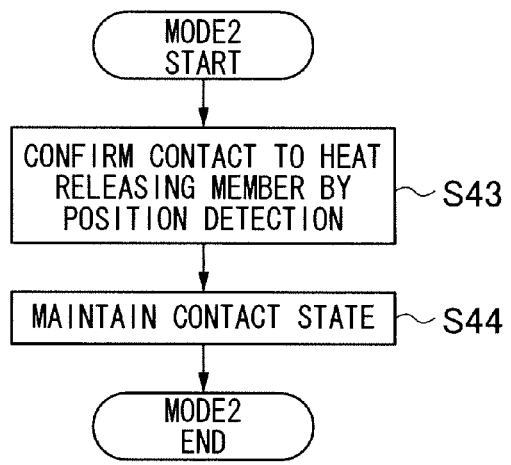
FIG. 22B is a flow chart illustrating a flow of a process of the mode 2 of the digital camera of the fourth embodiment.

When the power button is pressed to turn on the power of the digital camera 4 (step S1), the CPU 50 drives the image blur correction apparatus 24 in the mode 2 (step S40). In the present embodiment, as illustrated in FIG. 22B, the CCD case 30 and the CCD plate 31 move in the −y direction by gravity if an electric current is not applied to the coil 32b. Therefore, the CPU 50 uses the position detection element 78 to detect the position of the CCD plate 31 (step S12). When the position detection element 79 detects that the convex portion 31a and the heat exhausting member 32d are in contact and the detection signal is inputted to the CPU 50, the CPU 50 applies an electric current to the coil 32b and drives the voice coil motor 32A to terminate the CCD case 30 and the CCD plate 31 while the convex portion 31a and the heat exhausting member 32d are in contact (step S13).

The CPU 50 detects whether the operation mode of the digital camera 4 is the imaging mode (step S3). If the digital camera 4 is not in the imaging mode (NO in step S3), step S3 is executed again.

If the digital camera 4 is in the imaging mode (YES in S3), the image blur correction apparatus 24 is driven in the mode 1 to perform image blur correction concurrently with photographing of the through image (step S41).

The process of step S41 will be described (see FIG. 22A). The CPU 50 first uses the position detection element 78 to detect the position in the y direction and applies an electric current to the coil 32b if the center of the image pickup element 55 and the optical axis do not correspond to bring the center of the image pickup element 55 into line with the optical axis (step S42). Subsequently, the image pickup element 55 consecutively picks up images and consecutively processes the image signals to generate image data for through image. The generated image data is sequentially inputted to the video encoder 63, converted into a signal format for display, and outputted to the monitor 18. This starts photographing for through image by the image pickup element 55.

After the start of through image photographing, the CPU 50 executes a shake prevention process of correcting an image blur of a subject image picked up by the image pickup element 55 caused by vibration (such as camera shake) applied to the digital camera 4 (step S15).

The CPU 50 determines whether the shutter button 15 is half-pressed, in other words, whether an S1 ON signal is inputted to the CPU 50 (step S5). If the S1 ON signal is not inputted (NO in step S5), step S5 is executed again. If the S1 ON signal is inputted (YES in step S5), imaging preparation processes, in other words, AE, AF, and AWB processes, are executed in response to the S1 ON signal (step S6). The photographer operates the zoom button 19 as necessary to zoom the lens to adjust the angle of field.

The CPU 50 determines whether the shutter button 15 is full-pressed, in other words, whether an S2 ON signal is inputted to the CPU 50 (step S7). If the S2 ON signal is not inputted (NO in step S7), step S5 is executed again. If the S2 ON signal is inputted (YES in step S7), the imaging process and recording process (step S8) are executed in response to the S2 ON signal.

When the imaging process and the storage process (step S8) are executed, the CPU 50 drives the image blur correction apparatus 24 in the mode 2 (step S40). As a result, the convex portion 31a of the CCD plate 31 touches the heat exhausting member 32d, and the heat generated by the image pickup element 55 in the imaging preparation process (step S7) and the imaging process (step S8) is exhausted from the heat exhausting member 32d.

The CPU 50 inputs the compressed image data generated in step S8 to the compression/decompression processing device 60, converts the compressed image data to uncompressed image data, inputs the image data to the SDRAM 52, and performs preview display by outputting the image data from the SDRAM 52 to the monitor 18 through the video encoder 63 (step S9). The image blur correction apparatus 24 is driven in the mode 2 during the preview display (step S9), and the heat is continuously exhausted.

The CPU 50 detects whether the operation mode of the digital camera 4 is the imaging mode (step S3). If the digital camera 4 is in the imaging mode (YES in step S3), the image blur correction apparatus 24 is driven in the mode 1 to perform image blur correction concurrently with photographing of the through image (step S41). In this way, even in the continuous imaging (consecutive imaging), the image blur correction apparatus 24 is driven in the mode 2 until just before (step S40). Therefore, an increase in the temperature of the image pickup element 55 can be prevented, and the noise of image caused by heat can be reduced.

If the digital camera 4 is not in the imaging mode (NO in step S3), whether the power is off is determined (step S10). If the power is not off (NO in step S10), step S3 is executed again. If the power is off (YES in step S3), the process ends.

According to the present embodiment, if the image blur correction apparatus 27 is not driven in the mode 1, the convex portion 31b and the heat exhausting member 32d are always in contact, including when the power is off. Therefore, the power is not consumed to maintain the convex portion 31b and the heat exhausting member 32d that are in contact. Therefore, the heat generated by the image pickup element can be more efficiently exhausted.

Furthermore, according to the present embodiment, the CCD plate 31A can be pressed against the heat exhausting member 32d by constant force with less dispersion. Therefore, stable heat exhaust without dispersion is possible. For example, if a spring is used to press the CCD plate against the heat exhausting member, there is dispersion in the pressing force due to manufacturing errors of the springs. However, there is no such a problem in the present embodiment.

Although the heat exhausting member is arranged only on the voice coil motor 32A in the present embodiment, the heat exhausting member may also be arranged on the voice coil motor 35A as in the second embodiment. In this way, the heat can be exhausted not only from one direction, but also from two directions, and a larger heat exhausting effect can be obtained.

Unlike other embodiments, the voice coil motor is appropriate for the actuator of the image blur correction apparatus in the present embodiment. An expandable actuator, etc. using a stepping motor or a piezoelectric element, in which the position of the CCD plate is maintained even if the power is turned off, cannot be used.

In the present embodiment, although the convex portion 31b and the heat exhausting member 32d are brought into contact by gravity without applying an electric current to the coil 32b in the mode 2, the contact may not be surely made due to dispersion of weight, etc. of the image blur correction apparatus 27. Therefore, the position detection element 78 may be used to detect the positions of the CCD case 30 and the CCD plate 31, and if the convex portion 31b and the heat exhausting member 32d are not in contact, an electric current may be applied to the coil 32b to bring the convex portion 31a and the heat exhausting member 32d into contact.

Fifth Embodiment

In the second embodiment of the presently disclosed subject matter, an elastic member is used to bring the convex portion 31a of the CCD plate 31 and the heat exhausting member 35d into contact. However, there is a problem that the size and the cost increase if a spring is used to exhaust the heat. Although the convex portion 31b and the heat exhausting member 32d are always in contact by gravity in the fourth embodiment of the presently disclosed subject matter, an elastic member may be used so that the convex portion 31b and the heat exhausting member 32d are always in contact.

In a fifth embodiment, a main flexible substrate 40A is used as an elastic member so that the convex portion 31b and the heat exhausting member 32d are always in contact. A digital camera according to the fifth embodiment will be described. The same parts as in the fourth embodiment are designated with the same reference numerals, and the description will not be repeated. Actions of the digital camera 5 are the same as the actions of the digital camera 4, and the description will not be repeated.

The camera body 11 of the digital camera 5 is formed in a horizontally long rectangular box shape. An optical system 12D, the stroboscope 14, etc. are arranged on the front side. The shutter button 15, the power button 16, the mode dial 17, etc. are arranged on the upper side of the camera body 11. Meanwhile, the monitor 18, the zoom button 19, the arrow buttons 20, the MENU/OK button 21, the DISP/BACK button 22, the playback button 23, etc. are arranged on the back side of the camera body 11.

Details of the optical system 12D will be described. The optical system 12D mainly includes an aperture, a focus lens, a zoom lens (which are not illustrated), and an image blur correction apparatus 28.

Figure 23:
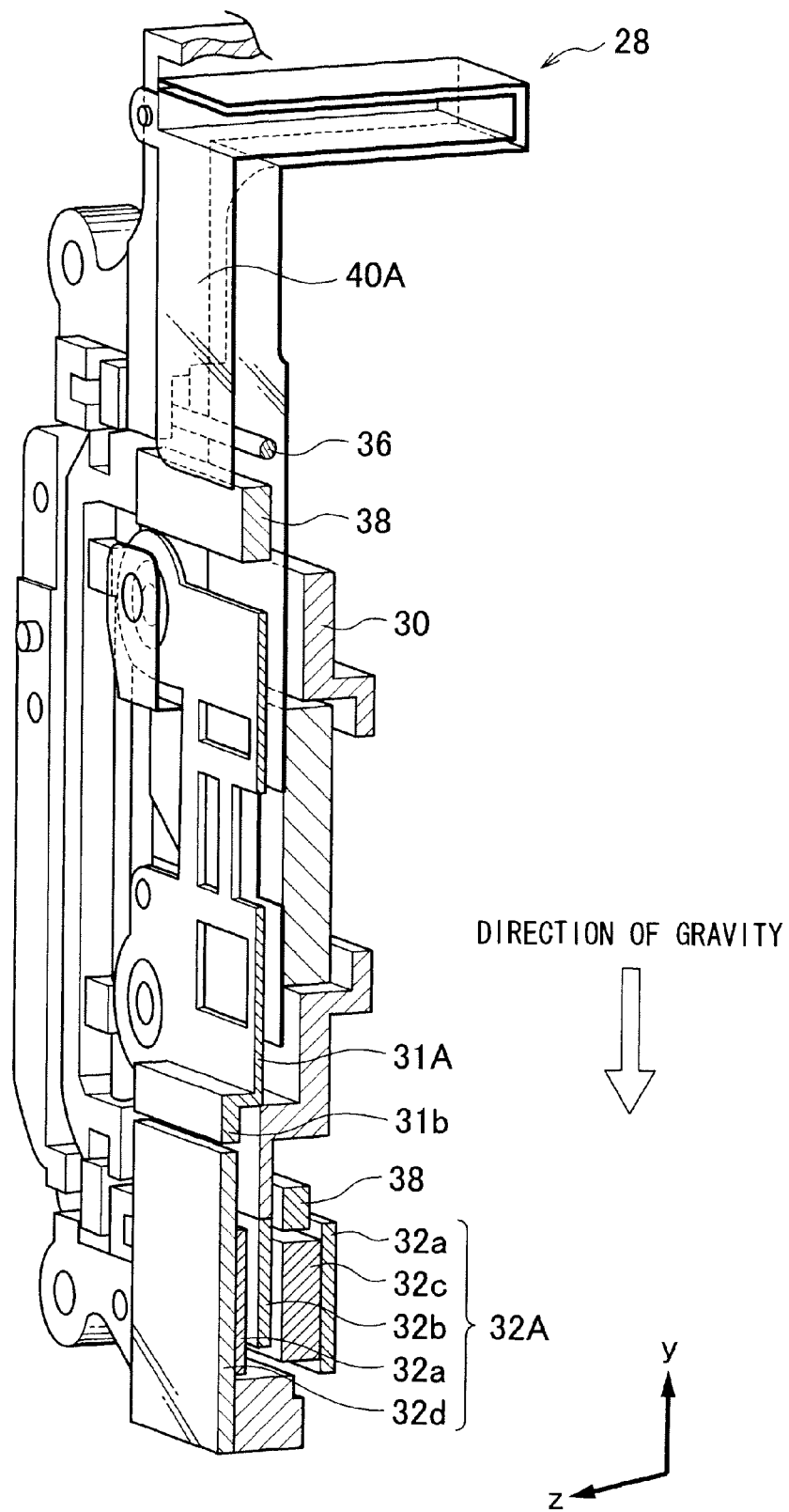
FIG. 23 is a schematic diagram of an image blur correction apparatus of a digital camera of a fifth embodiment of the presently disclosed subject matter.

FIG. 23 is a longitudinal sectional view of the image blur correction apparatus 28 when the main flexible substrate 40A is used as an elastic member. In the image blur correction apparatus 28, the gyro sensors 71 and 74 (see FIG. 5) detect shaking of the digital camera 5 and moves the image pickup element 55 (see FIG. 5) in the direction opposite the shaking of the digital camera 5 to correct the image blur of the subject image formed in the image pickup element 55.

Figure 24A:
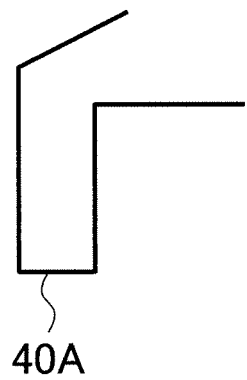
FIGS. 24A and 24B are diagrams explaining generation of elastic force by a main flexible substrate.
Figure 24B:
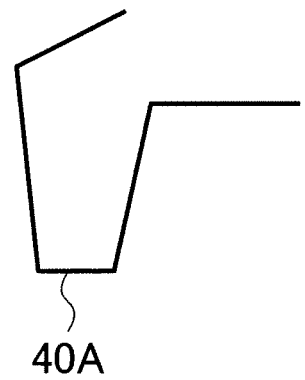

The basic length position of the power of spring and the energization direction of the power of spring of the main flexible substrate 40A vary depending on the way of forming a folding shape during assembly. A folding shape as illustrated in FIG. 24 is formed in the present embodiment, and the power of spring works in the extending direction of the main flexible substrate 40A. Therefore, the convex portion 31b can be pressed against the heat exhausting member 32d by arranging the main flexible substrate 40A as illustrated in FIG. 23.

According to the present embodiment, even if the power is off, the CCD plate can be pressed against the heat exhausting member with only existing components, without using a special spring member. Therefore, the heat can be efficiently exhausted.

Sixth Embodiment

In the first embodiment of the presently disclosed subject matter, the coil 35b of the voice coil motor 35 is moved to move the CCD case 30 and the CCD plate 31 in the +x direction. However, the method of moving the CCD case 30 and the CCD plate 31 in the +x direction is not limited to this.

In a sixth embodiment, the magnet of the voice coil motor is moved to move the CCD case and the CCD plate in the +x direction. A digital camera 6 of the sixth embodiment will be described. The same parts as in the first embodiment are designated with the same reference numerals, and the description will not be repeated. Actions of the digital camera 6 are the same as the actions of the digital camera 3, and the description will not be repeated.

The camera body 11 of the digital camera 6 is formed in a horizontally long rectangular box shape. An optical system 12E, the stroboscope 14, etc. are arranged on the front side. The shutter button 15, the power button 16, the mode dial 17, etc. are arranged on the upper side of the camera body 11. Meanwhile, the monitor 18, the zoom button 19, the arrow buttons 20, the MENU/OK button 21, the DISP/BACK button 22, the playback button 23, etc. are arranged on the back side of the camera body 11.

Details of the optical system 12E will be described. The optical system 12E includes an aperture, a focus lens, a zoom lens (which are not illustrated), and an image blur correction apparatus 29.

In the image blur correction apparatus 29, the gyro sensors 71 and 74 (see FIG. 5) detect shaking of the digital camera 6 and moves the image pickup element 55 (see FIG. 5) in the direction opposite the shaking of the digital camera 6 to correct the image blur of the subject image formed in the image pickup element 55.

Figure 25A:
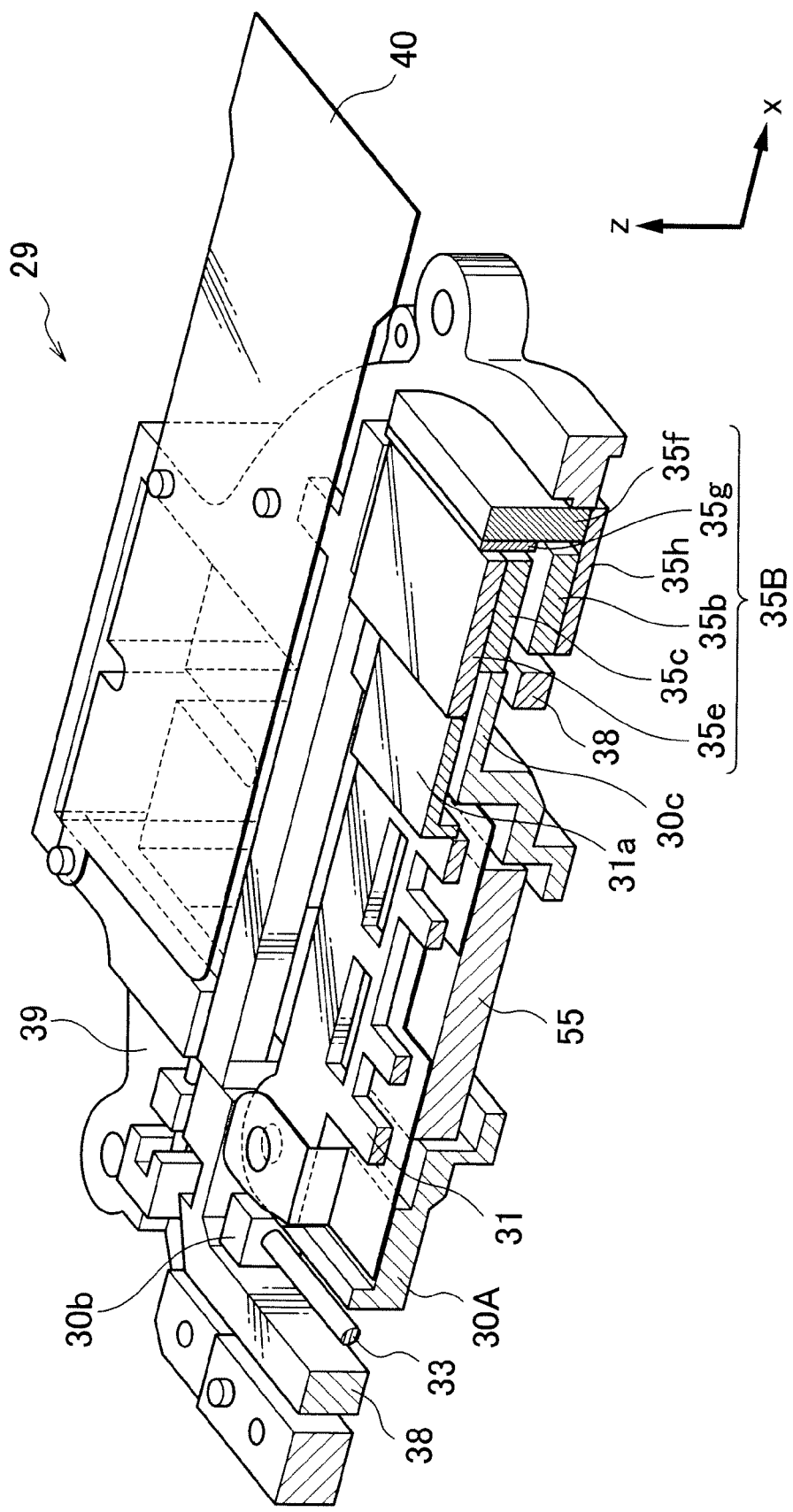
FIG. 25A is a schematic diagram of an image blur correction apparatus of a digital camera of a sixth embodiment of the presently disclosed subject matter, illustrating a state during imaging.
Figure 25B:
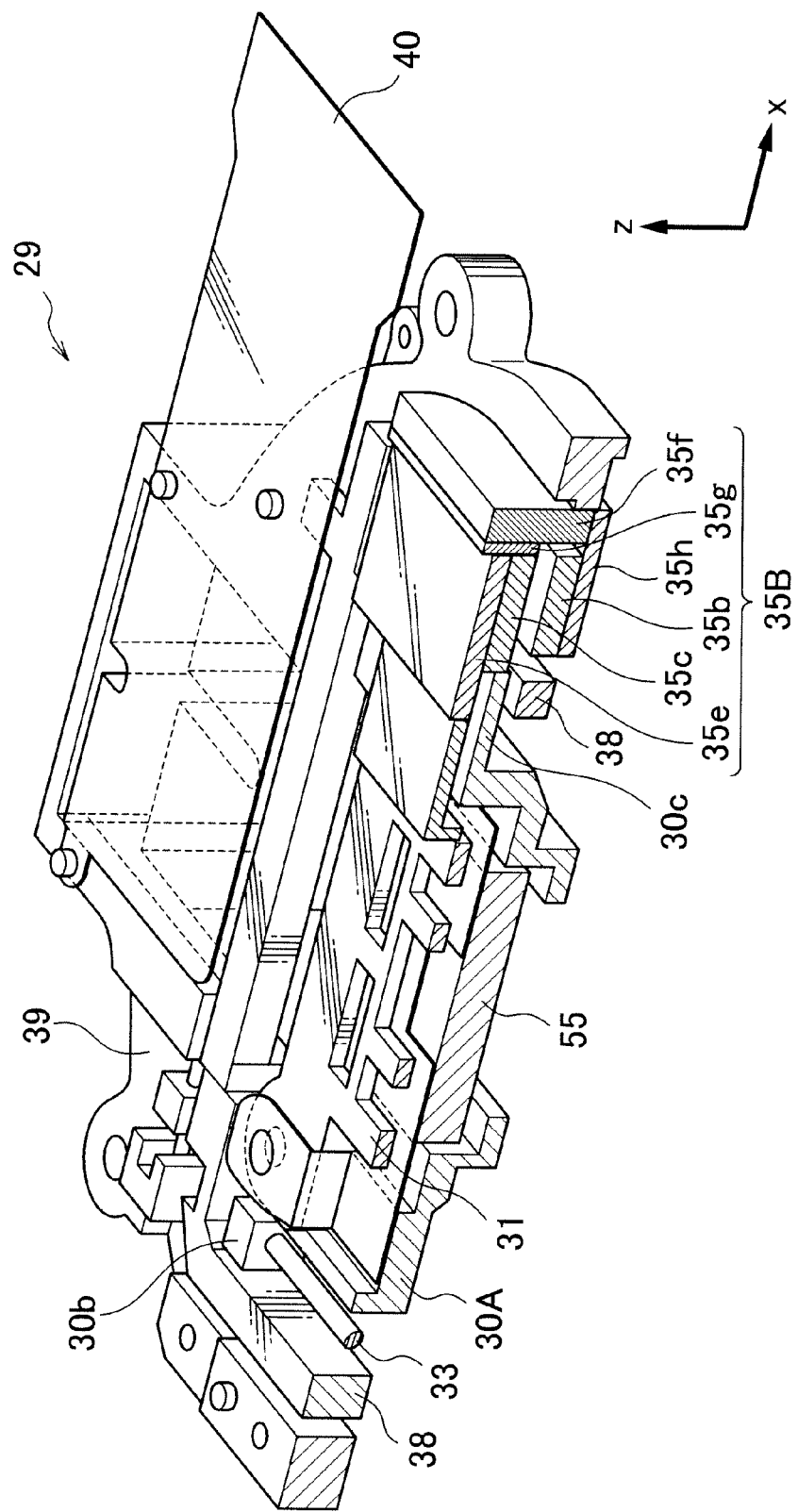
FIG. 25B is a schematic diagram of the image blur correction apparatus of the digital camera of the sixth embodiment of the presently disclosed subject matter, illustrating a state during exhausting heat

FIGS. 25A and 25B are transverse sectional views of the image blur correction apparatus 29. The image blur correction apparatus 29 includes a CCD case 30A, a CCD plate 31A, a voice coil motor 32, a main guide axis 33, a rotation stopping guide axis 34, a voice coil motor 35B, a main guide axis 36, a rotation stopping guide axis 37, a slider 38, a frame 39, a main flexible substrate 40, and a flexible substrate 41 for voice coil motor.

The CCD case 30A is a resin member for holding the image pickup element 55. A bearing 30a is formed near the right side (+x side) upper end (+y side) of the CCD case 30A, and the rotation stopping guide axis 34 is inserted. Bearings 30b are formed at two parts on the left side (−x direction) of the CCD case 30A, and the main guide axis 33 is inserted to the bearings 30b. The CCD plate 31 is screwed on the front side (+z side) of the CCD case 30A, and the magnet 35c and a yoke 35e constituting the voice coil motor 35B are arranged on the right side of the CCD case 30A.

The CCD plate 31A is a metallic plate-like member and is used for tilt adjustment, etc. A hole is formed at substantially the center of the CCD plate 31A, and the image pickup element 55 is exposed from the hole.

The voice coil motor 35B is constituted by a yoke 35e, a coil 35b, a magnet 35c, a heat exhausting member 35f, a gel member 35g for exhausting heat, and a fixation member 35h.

The yoke 35e is a metallic plate fixed to the CCD case 30A. The yoke 35e is arranged adjacent to the front side (+z side) of the magnet 35c to reduce the flux leakage by the magnet 35c.

The magnet 35c is a magnet, both sides of which are multipolar, and is arranged adjacent to the back side (−z side) of the yoke 35e.

The coil 35b is a cylindrical air core coil having a substantially rectangular cross section. The helix direction of the coil 35b is counterclockwise as seen from the +z direction, and the coil 35b is formed to overlap in the optical axis direction (z direction). The coil 35b is arranged on the front side (+z side) of the fixation member 35h. The coil 35b is located in the magnetic field of the magnet 35C even if the image pickup element 55 illustrated in FIG. 25A is on the optical axis or even if the CCD case 30A and the CCD plate 31A illustrated in FIG. 25B move in the +x direction to the maximum.

The heat exhausting member 35f is a substantially rectangular solid, metallic, nonmagnetic material member. The heat exhausting member 35f is arranged at a position which is a predetermined distance to the right side (+x side) of the coil 35b on the front side (+z side) of the fixation member 35h.

The gel member 35g for exhausting heat is an elastic heat-transfer gel member, such as silicon, and is arranged at the edge of the CCD plate 31A of the heat exhausting member 35f.

The fixation member 35h is a plate and is fixed to the frame 39.

According to the present embodiment, the magnet and the yoke can absorb heat generated by the image pickup element, and the heat can be exhausted from the magnet and the yoke to the heat exhausting member. This can enlarge the member that absorbs heat of the image pickup element, and the heat can be efficiently exhausted. Everything from the CCD plate to the heat exhausting member is made of metallic materials. Therefore, the heat can be efficiently exhausted, and an additional heat transfer member is not required.

Although a metallic member is used for the heat exhausting member in the present embodiment, the heat exhausting member is not limited to this. As long as the heat conductivity is high, a heat sink, etc. may be used.

Seventh Embodiment

Although the first embodiment of the presently disclosed subject matter is designed to exhaust heat generated by the image pickup element when an image is not taken, the heat may also be exhausted when an image is taken.

In a seventh embodiment, whether to exhaust heat is switched in accordance with the focus distance or the frame rate during photographing of a through image. A digital camera 7 of the seventh embodiment will be described. The configuration of the digital camera 7 is the same as that of the digital camera 1, and the description will not be repeated.

Figure 26:
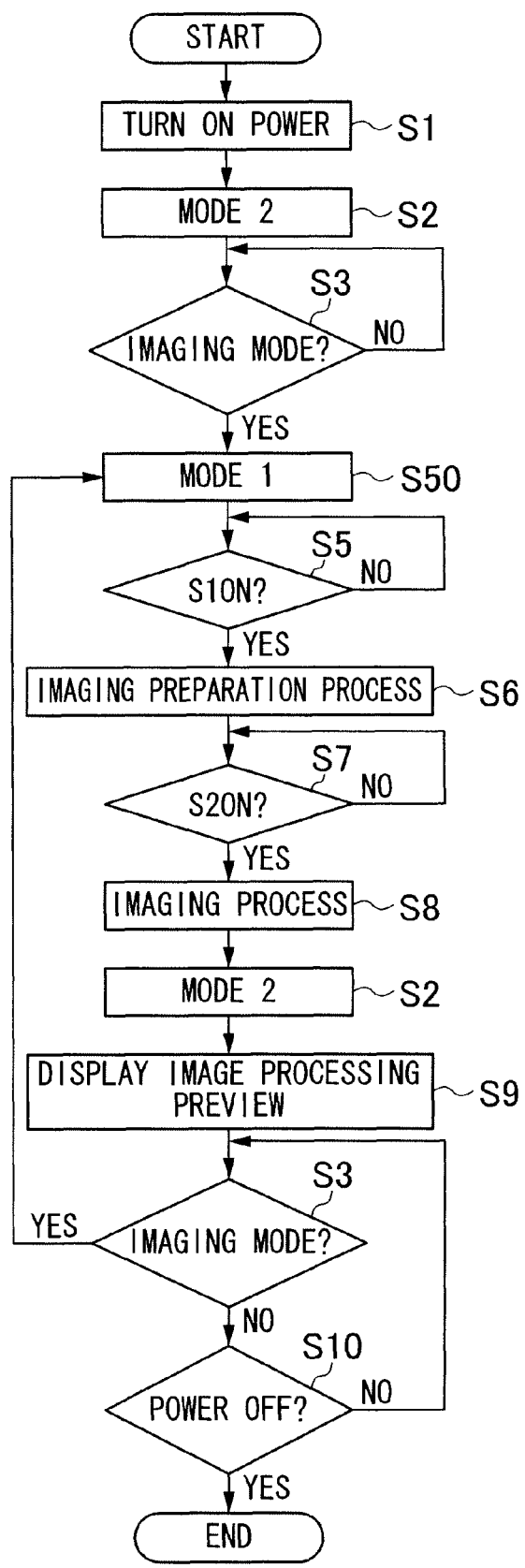
FIG. 26 is a flow chart illustrating a flow of a process of a digital camera of a seventh embodiment of the presently disclosed subject matter.

Actions of the digital camera 7 will be described. FIG. 26 is a flow chart illustrating a flow of a process of the digital camera 7. The CPU 50 mainly executes the following process.

When the power button is pressed to turn on the power of the digital camera 7 (step S1), the CPU 50 drives the image blur correction apparatus 24 in the mode 2 (step S2).

The CPU 50 detects whether the operation mode of the digital camera 7 is the imaging mode (step S3). If the digital camera 7 is not in the imaging mode (NO in step S3), step S3 is executed again.

If the digital camera 7 is in the imaging mode (YES in S3), the image blur correction apparatus 24 is driven in the mode 1 to perform image blur correction concurrently with photographing of the through image (step S50).

Figure 27:
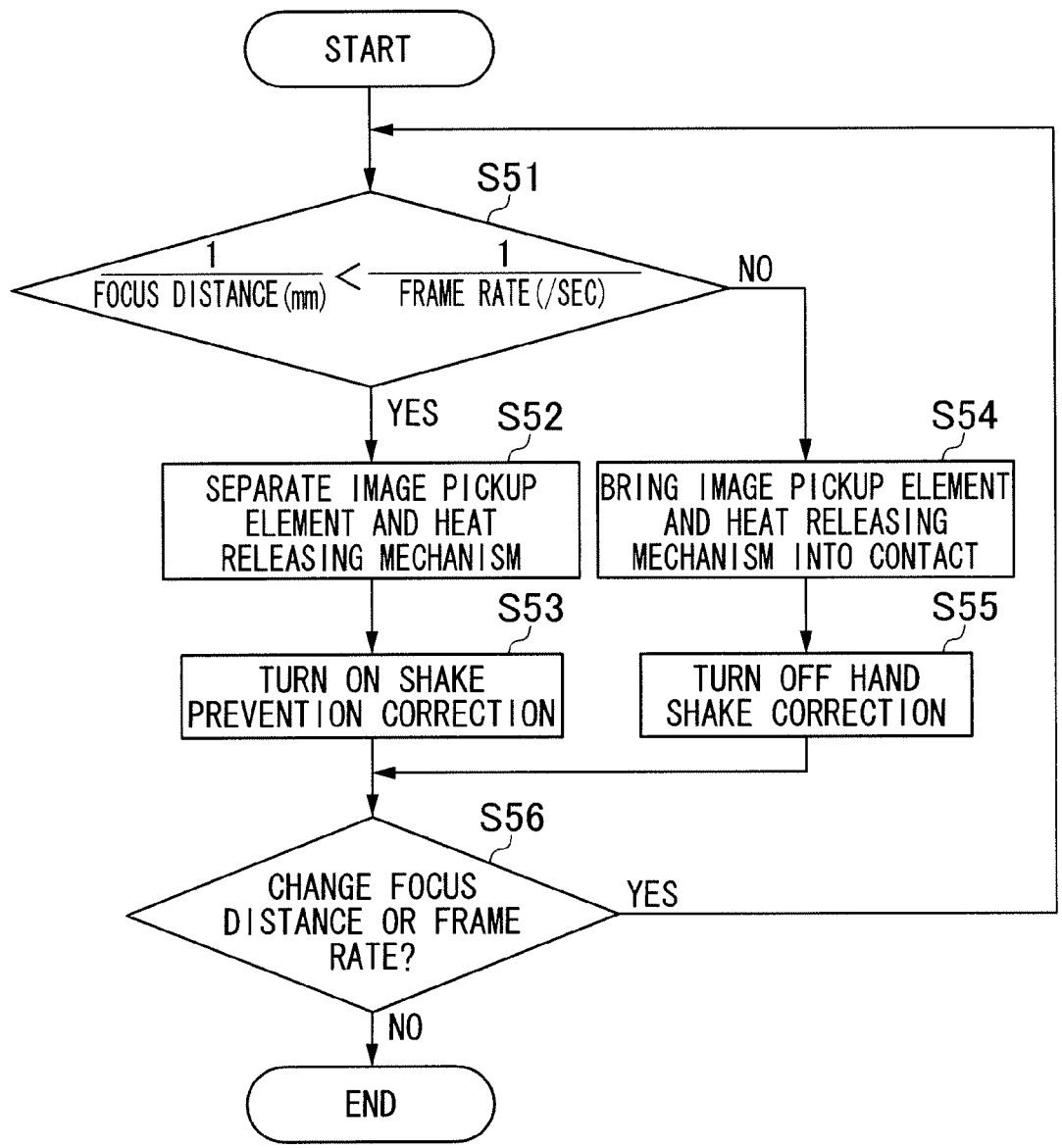
FIG. 27 is a flow chart illustrating a flow of a process of the mode 1 of the digital camera of the seventh embodiment.

The process of step S50 will be described with reference to FIG. 27. The CPU 50 determines whether the reciprocal of the focus distance in millimeters is greater or smaller than the reciprocal of the frame rate (step S51).

If the reciprocal of the focus distance is smaller than the reciprocal of the frame rate (YES in step S51), the camera can be easily influenced by shaking. Therefore, the CPU 50 applies an electric current to the coil 35b to separate the convex portion 31a of the CCD plate 31 and the heat exhausting member 35d to set a non-contact state (step S52). The CPU 50 brings the center of the image pickup element 55 into line with the optical axis to execute a shake prevention process for correcting an image blur of a subject image taken by the image pickup element 55, the image blur of which is caused by vibration (such as camera shake) applied to the digital camera 7, and to photograph a through image (step S53). The shake prevention process and the process of photographing the through image are the same as in the first embodiment, and the description will not be repeated.

If the reciprocal of the focus distance is greater than the reciprocal of the frame rate (NO in step S51), the focus distance is short, and the camera is not easily influenced by shaking. Therefore, the CPU 50 applies an electric current to the coil 35b to bring the convex portion 31a of the CCD plate 31 and the heat exhausting member 35d into contact. In that case, the number of pixels of the image pickup element 55 that can be used for photographing of the through image is small. However, the reduction in the image quality of the through image is not a significant problem, and an effect of exhausting heat, from the heat exhausting member 35d, generated by the image pickup element 55 at the same time as the photographing of the through image is more important.

The CPU 50 determines whether the shutter button 15 is half-pressed, in other words, whether an S1 ON signal is inputted to the CPU 50 (step S5). If the S1 ON signal is not inputted (NO in step S5), step S5 is executed again. If the S1 ON signal is inputted (YES in step S5), imaging preparation processes, in other words, AE, AF, and AWB processes, are executed in response to the S1 ON signal (step S6). The photographer operates the zoom button 19 as necessary to zoom the lens 14 to adjust the angle of field.

The CPU 50 determines whether the shutter button 15 is full-pressed, in other words, whether an S2 ON signal is inputted to the CPU 50 (step S7). If the S2 ON signal is not inputted (NO in step S7), step S5 is executed again. If the S2

ON signal is inputted (YES in step S7), the imaging process and recording process (step S8) are executed in response to the S2 ON signal.

When the imaging process and the storage process (step S8) are executed, the CPU 50 drives the image blur correction apparatus 24 in the mode 2 (step S2). As a result, the convex portion 31a of the CCD plate 31 touches the heat exhausting member 35d, and the heat generated by the image pickup element 55 in the imaging preparation process (step S7) and the imaging process (step S8) is exhausted from the heat exhausting member 35d.

The CPU 50 inputs the compressed image data generated in step S8 to the compression/decompression processing device 60, converts the compressed image data to uncompressed image data, inputs the image data to the SDRAM 52, and performs preview display by outputting the image data from the SDRAM 52 to the monitor 18 through the video encoder 63 (step S9). The image blur correction apparatus 24 is driven in the mode 2 during the preview display (step S9), and the heat is continuously exhausted.

The CPU 50 detects whether the operation mode of the digital camera 7 is the imaging mode (step S3). If the digital camera 7 is in the imaging mode (YES in S3), the image blur correction apparatus 24 is driven in the mode 1 to perform image blur correction concurrently with photographing of the through image (step S4). In this way, even in the continuous imaging, the image blur correction apparatus 24 is driven in the mode 2 until just before (step S2). Therefore, an increase in the temperature of the image pickup element 55 can be prevented, and the noise of image caused by heat can be reduced.

If the digital camera 7 is not in the imaging mode (NO in step S3), whether the power is off is determined (step S10). If the power is not off (NO in step S10), step S3 is executed again. If the power is off (YES in step S3), the process ends.

According to the present embodiment, the heat generated by imaging can be efficiently exhausted at the same time as the photographing of the through image.

Although an example of photographing a through image has been described in the present embodiment, the present embodiment can be applied not only to during photographing of the through image, but also to during moving image photographing, AF operation, and still image photographing (exposure). In the case of imaging the moving images, as in FIG. 27, the relationship between the reciprocal of the focus distance and the reciprocal of the frame rate can be used to determine whether to efficiently exhaust the heat.

Figure 28A:
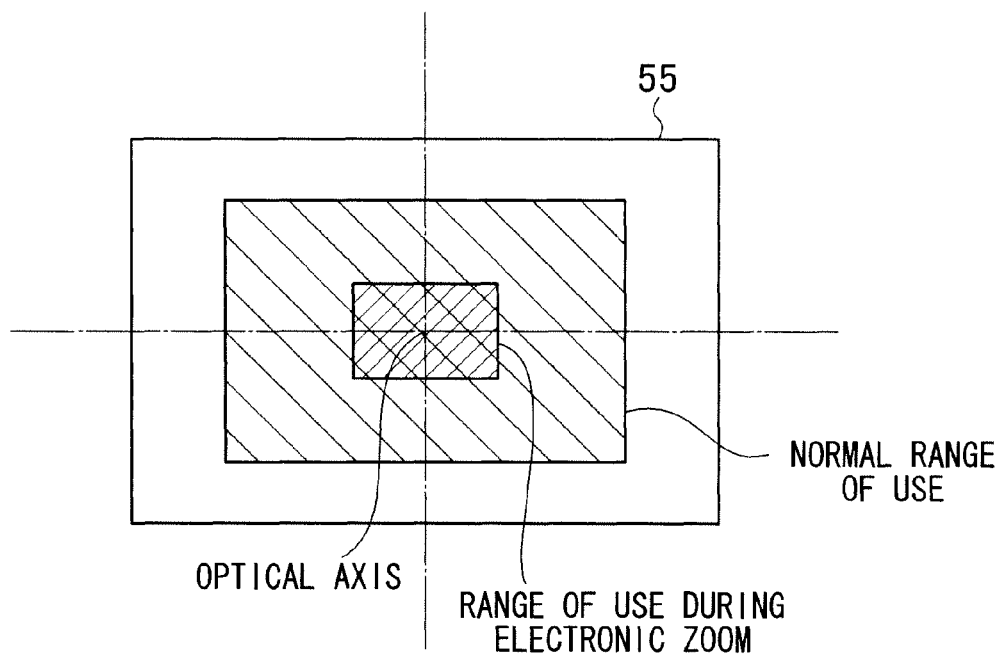
FIG. 28A is a diagram illustrating a position of an image pickup element during normal imaging.
Figure 28B:
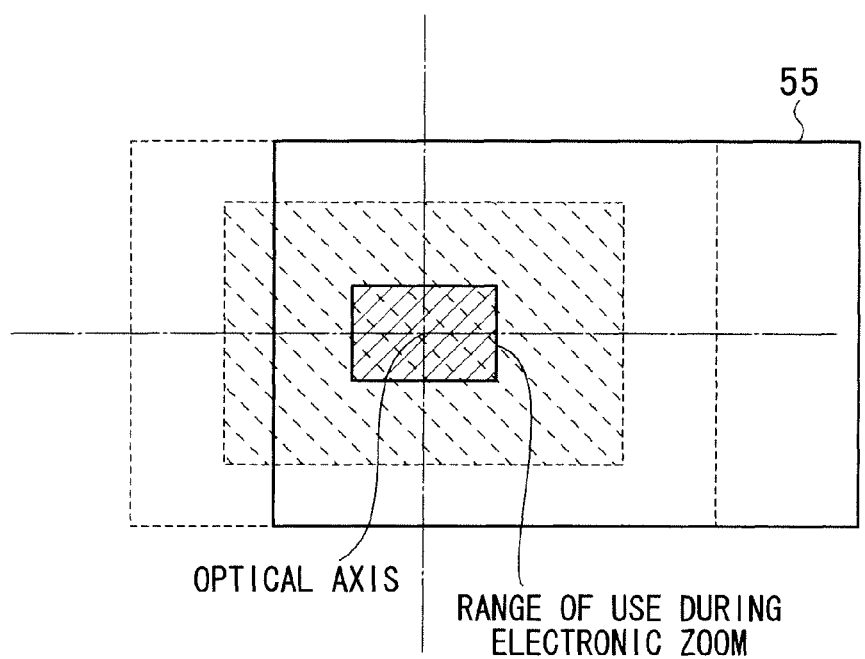
FIG. 28B is a diagram illustrating a position of the image pickup element during exhausting heat

FIG. 28A illustrates a case in which the center of the image pickup element 55 corresponds to the center of the optical axis. FIG. 28B illustrates a case in which the CCD plate 31 and the heat exhausting member 35d are brought into contact, and the center of the image pickup element 55 does not correspond to the center of the optical axis. In normal imaging, the subject image is formed on the majority of the entire area of the image pickup element 55. However, if an electronic zoom is used, the range where the subject image is formed is narrower than in the normal imaging. Therefore, as illustrated in FIG. 28B, if the magnification of the electronic zoom is greater than a predetermined magnification, the subject image can be formed in the image pickup element 55 even if the CCD plate 31 and the heat exhausting member 35d are brought into contact. Therefore, to apply the present embodiment to a still image, whether the magnification of the electronic zoom is greater than a predetermined threshold can be determined in the imaging process of step S8, and the CCD plate 31 and the heat exhausting member 35d can be brought into contact if the magnification of the electronic zoom is greater than the predetermined threshold to efficiently exhaust the heat. The present embodiment can be applied not only to the electronic zoom, but also to a case in which the center of the image circle can be used to form an image, such as in a thinning-out reading mode for thinning out the pixels to a lower pixel count to read out an image to record a still image. In that case, whether the number of pixels is smaller than a predetermined threshold can be determined, and the CCD plate 31 and the heat exhausting member 35d can be brought into contact if the number of pixels is smaller than the predetermined threshold.

In the case of a still image, the reciprocal of the focus distance and the shutter speed may be compared in the imaging process of step S8. The efficient heat exhausting may not be performed if the shutter speed is fast, and the efficient heat exhausting may be performed if the shutter speed is slow.

The presently disclosed subject matter can be applied not only to a digital camera, but also to any image pickup apparatus, such as a video camera, that is held by hand to take an image. The presently disclosed subject matter can be applied not only to a digital camera for taking still images, but also to an image pickup apparatus that can take moving images and live view images.

The presently disclosed subject matter may also be applied to a compound image pickup apparatus including a plurality of image pickup units with combinations of optical systems and image pickup elements. In this case, an image pickup unit that is picking up an image and an image pickup unit that is not picking up an image may exist. For example, an image is picked up by both image pickup units in photographing of a stereoscopic image, and an image is picked up only by one of the image pickup units in photographing of a plane image. In such a case, a shake prevention operation is performed in the image pickup unit that is picking up an image because the camera shake needs to be corrected. In the image pickup unit that is not picking up an image, the CCD case and the CCD plate may be brought into contact with the heat exhausting member to improve the heat exhausting effect because the camera shake correction is not necessary.

What is claimed is:
1. An image pickup apparatus comprising:
an image pickup element on which an image of a subject is formed;
a shake detection device configured to detect a vibration applied to a main body of the image pickup apparatus; and
an image blur correction device configured to perform a correction of removing an image blur of the image generated by the vibration detected by the shake detection device,
the image blur correction device comprising:
a holding member configured to hold the image pickup element;
a first driving device configured to move the holding member in a direction orthogonal to an optical axis of the image pickup apparatus and move the holding member between a first position where the center of the image pickup element substantially corresponds to the optical axis and a second position where the center of the image pickup element is not located on the optical axis;
a heat exhausting member arranged to be not in contact with the holding member when the holding member is located at the first position, and to be in contact with the holding member when the holding member is located at the second position; and a control device configured to drive the first driving device based on the vibration detected by the shake detection device.

2. The image pickup apparatus according to claim 1, wherein
the first driving device comprises a voice coil motor, and
the heat exhausting member includes at least one of a magnet and a yoke constituting the voice coil motor.

3. The image pickup apparatus according to claim 1, further comprising
an elastic member configured to press the holding member against the heat exhausting member.

4. The image pickup apparatus according to claim 3, wherein
the elastic member comprises a spring arranged on the holding member.

5. The image pickup apparatus according to claim 3, wherein
the elastic member comprises a flexible printed circuit board arranged on the image pickup element.

6. The image pickup apparatus according to claim 1, wherein
the holding member is placed at the second position by gravity when the image pickup apparatus is held at a regular orientation and the first driving device is not driven.

7. The image pickup apparatus according to claim 1, further comprising
a second driving device configured to bring the heat exhausting member into contact with the holding member.

8. The image pickup apparatus according to claim 1, wherein
in the heat exhausting member, a heat-transfer elastic member is arranged to be in contact with the holding member when the holding member is located at the second position.

9. The image pickup apparatus according to claim 1, wherein
the image pickup element is arranged on the holding member so that a heat generation unit formed on the image pickup element and the heat exhausting member are brought into contact in a shortest distance.

10. The image pickup apparatus according to claim 9, wherein
the image pickup element comprises a CCD image sensor including a horizontal transfer path as the heat generation unit.

11. The image pickup apparatus according to claim 1, further comprising:
an image pickup device configured to acquire an image of a subject by the image pickup element; and
a detection device configured to detect whether the image pickup device has acquired the image of the subject,
wherein if the detection device does not detect the acquisition of the image of the subject, the control device drives the first driving device to move the holding member to the second position.

12. The image pickup apparatus according to claim 10, wherein
the image pickup device comprises an electronic zooming device configured to cut out a part of the image formed on the image pickup element to change an imaging magnification,
the detection device detects whether the image of the subject in which the imaging magnification is changed by the electronic zooming device is acquired, and
the control device drives the first driving device to bring the holding member into contact with the heat exhausting member if the detection device detects that the image of the subject with the changed imaging magnification is acquired and that the imaging magnification is greater than a predetermined threshold.

13. The image pickup apparatus according to claim 10, wherein
the image pickup device comprises a thinning-out reading device configured to read out an image with the number of pixels smaller than the number of pixels of the image pickup element,
the detection device detects whether the thinning-out reading device has acquired an image with the number of pixels smaller than the number of pixels of the image pickup element, and
the control device brings the holding member into contact with the heat exhausting member if the detection device detects that the image with the number of pixels smaller than the number of pixels of the image pickup element is acquired and that the number of pixels is smaller than a predetermined threshold.

14. The image pickup apparatus according to claim 10, further comprising
a position detection device configured to detect a position of the holding member,
wherein if the position detection device detects that the holding member is located at the second position and the detection device detects that the image pickup device has started acquiring the image of the subject, the control device drives the first driving device by driving force greater than driving force for driving the first driving device based on the vibration detected by the shake detection device to move the holding member to the first position.

15. The image pickup apparatus according to claim 1, further comprising
a case made of a heat-transfer material,
wherein the heat exhausting member is arranged to be in contact with the case.

16. The image pickup apparatus according to claim 1, wherein the first driving device further comprises a slider.

17. The image pickup apparatus according to claim 1, further comprising a position detection device configured to detect if the holding member and the heat exhausting member are not in contact.

18. The image pickup apparatus according to claim 17, wherein if the position detection device detects that the holding member and the heat exhausting member are not in contact, the holding member is moved in a direction such that the holding member and the heat exhausting member are brought into contact.

19. The image pickup apparatus according to claim 1, wherein the shake detection device is turned off after the image is formed, and the holding member and the heat exhausting member are brought into contact.

20. The image pickup apparatus according to claim 9, wherein
the image pickup element comprises a CMOS image sensor including a horizontal transfer path as the heat generation unit.

* * * * *